(12) United States Patent
Carnevali

(10) Patent No.: US 7,988,106 B2
(45) Date of Patent: Aug. 2, 2011

(54) ADAPTIVE MOUNTING STRUCTURE

(76) Inventor: Jeffrey D. Carnevali, Seattle, WA (US)

( * ) Notice: Subject to any disclaimer, the term of this patent is extended or adjusted under 35 U.S.C. 154(b) by 913 days.

(21) Appl. No.: 11/710,358

(22) Filed: Feb. 23, 2007

(65) Prior Publication Data

US 2008/0203263 A1 Aug. 28, 2008

(51) Int. Cl.
*A47G 23/02* (2006.01)
(52) U.S. Cl. .................... 248/146; 248/346.01; 248/910
(58) Field of Classification Search ............. 248/346.01, 248/346.02, 146, 160, 687, 910
See application file for complete search history.

(56) References Cited

U.S. PATENT DOCUMENTS

| | | | |
|---|---|---|---|
| 1,778,545 A * | 10/1930 | Allen | 248/105 |
| 2,219,974 A * | 10/1940 | Bellow | 220/632 |
| 2,319,377 A | 5/1943 | Wallace et al. | |
| 2,733,492 A | 2/1956 | Corpell | |
| 3,509,882 A | 5/1970 | Blake | |
| 3,565,656 A | 2/1971 | Allen et al. | |
| 3,858,263 A | 1/1975 | Smirnov et al. | |
| 3,936,403 A | 2/1976 | Sakaguchi et al. | |
| 3,963,677 A | 6/1976 | Enger | |
| 3,981,342 A | 9/1976 | Farber et al. | |
| 3,996,175 A | 12/1976 | Schreiber et al. | |
| 4,042,550 A | 8/1977 | Tuller et al. | |
| 4,066,231 A | 1/1978 | Bahner et al. | |
| 4,118,003 A | 10/1978 | Dillow | |
| 4,145,477 A | 3/1979 | Smiley | |
| 4,148,122 A | 4/1979 | Phillips et al. | |
| 4,162,696 A * | 7/1979 | Sprung | 206/316.2 |
| 4,174,823 A | 11/1979 | Sutton et al. | |
| 4,188,680 A | 2/1980 | Adams | |
| 4,195,001 A | 3/1980 | Lytton | |
| 4,228,060 A | 10/1980 | Pez | |
| 4,246,157 A | 1/1981 | Laitar | |
| 4,291,851 A | 9/1981 | Johnson | |
| 4,336,071 A | 6/1982 | Schnorrer | |
| D271,481 S | 11/1983 | Sugai | |
| 4,579,921 A | 4/1986 | Gouarderes et al. | |
| 4,663,210 A | 5/1987 | Schreiber et al. | |
| 4,737,538 A | 4/1988 | Halper et al. | |
| 4,795,117 A * | 1/1989 | Siteman | 248/146 |
| 4,798,294 A | 1/1989 | Bodi | |
| 4,802,708 A | 2/1989 | Vos et al. | |
| 4,803,759 A | 2/1989 | Kemble | |
| 4,882,401 A | 11/1989 | Bell | |
| 4,928,916 A | 5/1990 | Molloy | |
| 4,957,264 A | 9/1990 | Hakanen | |

(Continued)

OTHER PUBLICATIONS 2 pages of "D:\Data Sheet Putty 040810.doc" for Linseed Oil Putty, dated Oct. 1, 2002.

*Primary Examiner* — Ramon O Ramirez
(74) *Attorney, Agent, or Firm* — Charles J. Rupnick Attorney at Law

(57) ABSTRACT

A novel adaptive mounting device that effectively mounts and secures objects to nonplanar surfaces, and in particular effectively mounts and secures objects in a quick and efficient manner to complex contours of different automotive vehicle dashboard and other interior vehicle surfaces having differing coverings of differing textures. By example and without limitation, this novel adaptive mounting device includes a substantially flexible container containing a substantially plastically formable composition; a frame at least partially embedded in the plastically formable composition; and a presentation structure substantially supported on the frame external of the container. A method for manufacturing the novel adaptive mounting device is also provided.

28 Claims, 7 Drawing Sheets

U.S. PATENT DOCUMENTS

| | | | |
|---|---|---|---|
| 4,976,721 A | 12/1990 | Blasnik et al. | |
| 5,024,408 A | 6/1991 | Magee | |
| 5,066,714 A | 11/1991 | Inoue et al. | |
| 5,104,930 A | 4/1992 | Rinde et al. | |
| 5,145,933 A | 9/1992 | Grisoni et al. | |
| 5,149,032 A | 9/1992 | Jones et al. | |
| 5,165,636 A | 11/1992 | Grissom | |
| 5,171,766 A | 12/1992 | Mariano et al. | |
| 5,238,622 A | 8/1993 | Grimmer et al. | |
| 5,364,892 A | 11/1994 | Miller et al. | |
| 5,370,831 A | 12/1994 | Blair et al. | |
| 5,412,069 A | 5/1995 | LeCompte et al. | |
| 5,431,831 A | 7/1995 | Vincent | |
| 5,457,745 A | 10/1995 | Wang | |
| 5,498,645 A | 3/1996 | Mariano et al. | |
| 5,506,280 A | 4/1996 | Miller et al. | |
| 5,582,377 A | 12/1996 | Quesada | |
| D377,798 S | 2/1997 | Heine | |
| 5,607,993 A | 3/1997 | Christy | |
| 5,620,636 A | 4/1997 | Kawai et al. | |
| 5,653,414 A | 8/1997 | Chimel | |
| 5,665,809 A | 9/1997 | Wojtowicz | |
| 5,673,628 A | 10/1997 | Boos | |
| 5,679,734 A | 10/1997 | Peccoux et al. | |
| D390,849 S | 2/1998 | Richter et al. | |
| 5,763,026 A | 6/1998 | Makino et al. | |
| 5,776,520 A | 7/1998 | Howe et al. | |
| 5,788,202 A | 8/1998 | Richter | |
| 5,793,614 A | 8/1998 | Tollbom | |
| 5,845,885 A * | 12/1998 | Carnevali | 248/181.1 |
| 5,873,933 A | 2/1999 | Mackey | |
| 5,903,645 A | 5/1999 | Tsay | |
| 5,916,949 A | 6/1999 | Shapero et al. | |
| 5,917,907 A | 6/1999 | Kela | |
| 6,012,452 A | 1/2000 | Pagan | |
| 6,032,337 A | 3/2000 | Rankin et al. | |
| 6,067,731 A | 5/2000 | Chen et al. | |
| 6,073,902 A | 6/2000 | Hiles | |
| 6,076,790 A | 6/2000 | Richter | |
| 6,095,470 A | 8/2000 | Kalis | |
| 6,127,504 A | 10/2000 | Fukuda et al. | |
| 6,169,155 B1 | 1/2001 | Alvarez et al. | |
| 6,173,933 B1 | 1/2001 | Whiteside et al. | |
| 6,213,438 B1 | 4/2001 | Ostby et al. | |
| 6,229,893 B1 | 5/2001 | Chen | |
| 6,370,741 B1 | 4/2002 | Lu | |
| 6,427,959 B1 | 8/2002 | Kalis et al. | |
| 6,439,530 B1 | 8/2002 | Schoenfish et al. | |
| 6,566,435 B1 | 5/2003 | Teoh et al. | |
| 6,578,205 B1 | 6/2003 | King | |
| 6,581,888 B1 * | 6/2003 | Castillo | 248/146 |
| 6,600,827 B2 | 7/2003 | Lu | |
| 6,647,248 B1 | 11/2003 | Ortscheid et al. | |
| 6,706,222 B2 | 3/2004 | Gallagher et al. | |
| 6,785,567 B2 | 8/2004 | Kato | |
| 6,802,848 B2 | 10/2004 | Anderson et al. | |
| 6,814,377 B2 | 11/2004 | Silverman et al. | |
| 6,817,587 B2 | 11/2004 | Lin | |
| 6,837,924 B2 | 1/2005 | Breindl et al. | |
| 6,840,487 B2 | 1/2005 | Carnevali | |
| 6,881,781 B1 | 4/2005 | Gamba | |
| 6,884,822 B2 | 4/2005 | Wang et al. | |
| 7,017,243 B2 | 3/2006 | Carnevali | |
| 7,032,872 B2 | 4/2006 | Sullivan | |
| 7,067,570 B2 | 6/2006 | Ikeno et al. | |
| 7,147,707 B2 | 12/2006 | Murakami et al. | |
| 2004/0022388 A1 | 2/2004 | Chan et al. | |
| 2007/0152117 A1 | 7/2007 | Byrd | |
| 2008/0011914 A1 * | 1/2008 | McCombs | 248/146 |

* cited by examiner

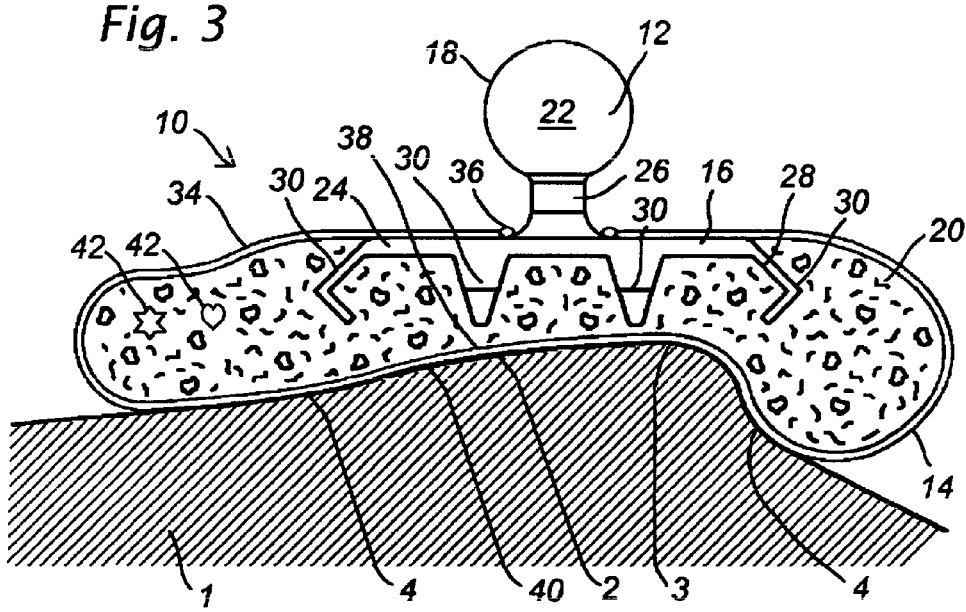
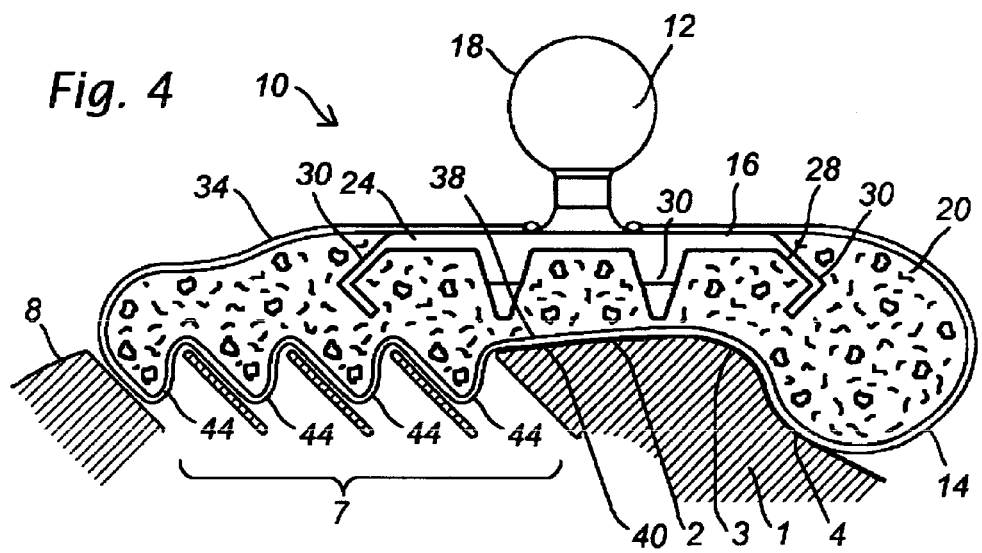

ADAPTIVE MOUNTING STRUCTURE

FIELD OF THE INVENTION

The present invention relates to the field of temporary mounts for securing objects to nonplanar surfaces, and in particular to temporary mounts for securing objects to automotive vehicle dashboard and other interior surfaces having pronounced complex contours and coverings of differing textures of vacuum-formed ABS or PVC sheet or coverings made of foamed sheet, synthetic leather-like materials such as vinyl, leather, imitation leather, textile fabric, or the like.

BACKGROUND OF THE INVENTION

Suction cup mounts are generally well-known and commonly used to temporarily mount and secure objects to hard smooth surfaces such as the surfaces of glass, plastic, Formica, glazed tile, metal, and other hard smooth surfaces. A vehicle's windshield is one convenient surface that lends itself to mounting a suction cup device. However, paraphernalia mounted on the windshield may interfere with a driver's vision and is expected to raise safety concerns.

Unfortunately, interiors of automotive and other vehicles provide few other hard smooth surfaces appropriate for mounting a suction cup, especially within view of the driver.

As disclosed by Schreiber, et al. in U.S. Pat. No. 4,663,210 "Paneling Member For The Interior Of Automotive Vehicles, Especially A Dashboard" issued May 5, 1987, which is incorporated herein by reference, modern vehicle dashboards generally have a rigidifying supporting member molded into a semi-hard polyurethane foam body, usually having pronounced artistic contours. The foam body is covered on the side facing the passenger compartment with a covering of vacuum-formed ABS or PVC sheet of differing colors and textures. Alternatively, the covering is made of foamed sheet, synthetic leather-like materials such as vinyl, leather, imitation leather, textile fabric, or the like.

These foam-covered pronounced artistic contours and synthetic imitation finishes provide few other hard smooth surfaces appropriate for mounting a suction cup. Thus, temporarily mounting and securing objects to automotive vehicle interior surfaces is often problematic.

SUMMARY OF THE INVENTION

The present invention overcomes limitations of the prior art by providing a novel adaptive mounting device that effectively mounts and secures objects to nonplanar surfaces, and in particular effectively mounts and secures objects in a quick and efficient manner to complex contours of different automotive vehicle dashboard and other interior vehicle surfaces having differing coverings of differing textures.

According to one aspect of the invention, in its broad aspect this novel adaptive mounting device includes a substantially flexible container containing a substantially plastically formable composition; a frame at least partially embedded in the plastically formable composition; and a presentation structure substantially supported on the frame external of the container.

According to another aspect of this novel adaptive mounting device, the container is a skin of the plastically formable composition formed as a self-skinning characteristic of the composition.

According to another aspect of this novel adaptive mounting device, the container is further formed of a substantially flexible material. Optionally, the container is further formed of a first layer of a first substantially flexible material, and a second layer of a second substantially flexible material over the first layer.

According to another aspect of this novel adaptive mounting device, the container further includes a traction mechanism formed on a portion of the outer surface thereof.

According to another aspect of this novel adaptive mounting device, the frame further includes a connector structure that is at least partially embedded in the plastically formable composition.

According to another aspect of this novel adaptive mounting device, the plastically formable composition is further formed of a cohesively strong but pliable and ductile compound, which is optionally a putty composed of base of whiting (finely ground chalk) with linseed oil mixed in various proportions, however a number of synthetic alternatives exist.

According to another aspect of this novel adaptive mounting device, the plastically formable composition further includes a hardenable component and a hardening agent.

According to yet another aspect of the invention, in its broad aspect a novel method is provided for manufacturing this novel adaptive mounting device, the novel method including, in a substantially flexible container, providing a substantially plastically formable composition; at least partially embedding a portion of a frame in the plastically formable composition; and substantially supporting a presentation structure on the frame external of the container.

According to another aspect of the method of the invention, the method further includes forming the container as an envelope of substantially flexible material.

According to another aspect of the method of the invention, the method of forming the container as an envelope of substantially flexible material further includes substantially sealing the composition in the container.

According to another aspect of the method of the invention, the method of forming the container as an envelope of substantially flexible material further includes forming a layer of elastomeric material over the composition.

According to another aspect of the method of the invention, the method of forming the container as an envelope of substantially flexible material by forming a layer of elastomeric material over the composition further includes forming a second layer of elastomeric material over a first layer of elastomeric material.

According to another aspect of the method of the invention, the method of providing a substantially plastically formable composition further includes providing a putty compound formed of oil and ground chalk, for example, a putty compound composed of base of whiting (finely ground chalk) with linseed oil mixed in various proportions, however a number of synthetic alternatives exist.

According to another aspect of the method of the invention, the method further includes providing the substantially plastically formable composition as having a hardenable component, and further providing means for introducing a hardening agent to the composition.

Other aspects and objects, features, and advantages of the invention will be apparent in the written description which follows.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3 illustrates the novel adaptive mounting device having the envelope substantially filled with a plastically formable composition and installed on an exemplary surface having pronounced and complex contours;

FIG. 4 illustrates the novel adaptive mounting device installed on an exemplary surface having pronounced and complex contours with a portion of the envelope substantially conformed to an exemplary set of louvers;

FIGS. 9-14 illustrate another method of manufacturing the adaptive mounting device, wherein FIG. 9 illustrates the connector structure being initially embedded in the self-binding composition of the malleable base structure, FIG. 10 illustrates the envelope being formed over the shaped self-binding composition of the malleable base structure by coating with a first elastomeric layer, FIG. 11 illustrates an optional manufacturing operation for providing a second outer elastomeric layer over the first elastomeric layer, and FIG. 12 illustrates a base portion of the envelope being provided with a traction enhancing mechanism optionally formed as a traction enhancing protrusions, FIG. 13 illustrates the traction enhancing mechanism optionally formed as a double-backed adhesive tape or resilient adhesive pad applied to the base portion of the envelope, and FIG. 14 illustrates the rigid plate of the frame being formed by example and without limitation having a substantially circular shape.

DETAILED DESCRIPTION OF PREFERRED EMBODIMENT

In the Figures, like numerals indicate like elements.

The terms "up" and "down" and "right" and "left" and derivatives are used solely for clarity in describing the invention and relate to the relative orientation of the individual components shown in the Figures and the assembly relative to a surface to which it is attached.

The present invention is a universal mounting device that effectively mounts and secures objects to automotive vehicle interior surfaces in a quick and efficient manner.

Figure 1:
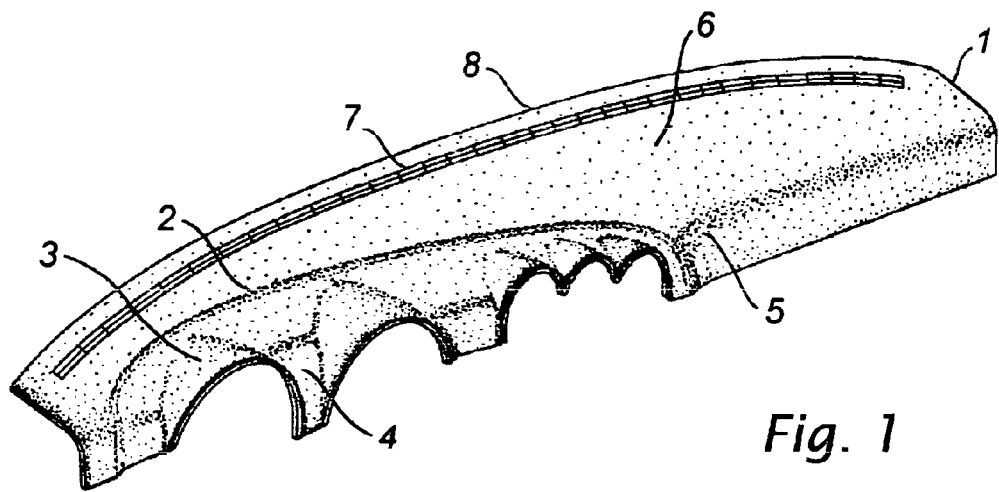
FIG. 1 is a perspective view of an exemplary automotive vehicle dashboard.

FIG. 1 is an exemplary illustration of a conventional automotive or other vehicle dashboard 1 having by example and without limitation pronounced and complex contours 2. The contours 2 of many such vehicle dashboards 1 include adjacent peaks 3 and valleys 4 with other portions being formed with wide areas of gentle curves 5 and relatively smooth fields 6. Many such vehicle dashboards 1 also include a set of louvers 7 shown here near a forward edge 8 adjacent to where a windshield is positioned when the dashboard 1 is mounted in a vehicle.

As discussed herein above and disclosed in U.S. Pat. No. 4,663,210, which is incorporated herein by reference, such a vehicle dashboard 1 generally has a rigidifying supporting member molded into a semi-hard polyurethane foam body, usually having pronounced artistic contours. The foam body is covered on the side facing the passenger compartment with a covering of vacuum-formed ABS or PVC sheet of differing colors and textures. Alternatively, the covering is made of foamed sheet, synthetic leather-like materials such as vinyl, leather, imitation leather, textile fabric, or the like. Such contours and finishes generally make problematic temporarily mounting and securing objects to automotive vehicle interior surfaces.

Figure 2:
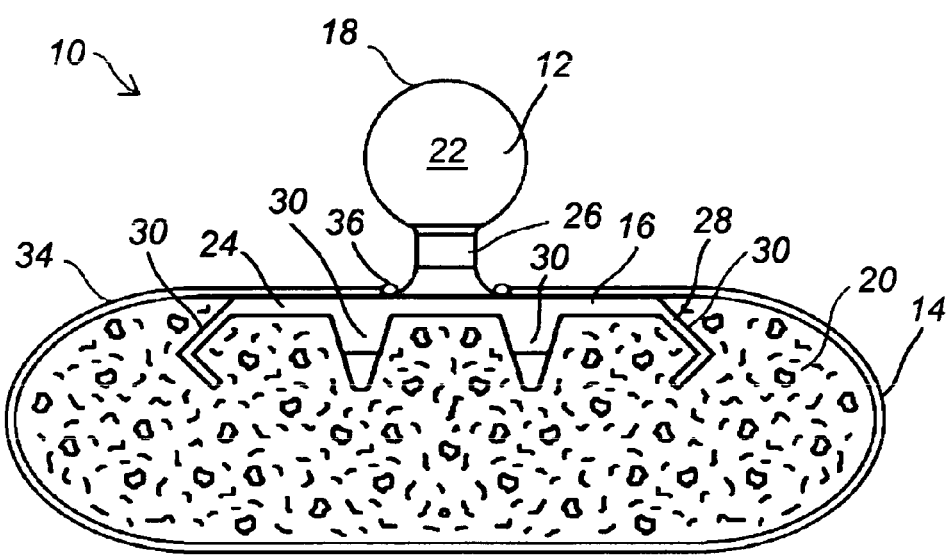
FIG. 2 illustrates by example and without limitation a novel adaptive mounting device that effectively mounts and secures objects in a quick and efficient manner to surfaces having pronounced and complex contours.

FIG. 2 illustrates by example and without limitation a novel adaptive mounting device 10 that effectively mounts and secures objects to automotive vehicle interior surfaces, such as the pronounced and complex contours 2 of the automotive vehicle dashboard 1, in a quick and efficient manner.

In the exemplary embodiment illustrated here, the novel adaptive mounting device 10 includes a mounting structure 12 in combination with a malleable base structure 14. The mounting structure 12 includes a frame 16 holding a coupler or other presentation structure 18 for mounting different paraphernalia and embedded in a plastically formable or "moldable" composition 20.

By example and without limitation, the presentation structure 18 is optionally a ball-end mount or "coupler" of the type disclosed by Jeffrey D. Carnevali, the inventor of the present mounting device 10, in U.S. Pat. No. 5,845,885, entitled "Universally Positionable Mounting Device," issued Dec. 8, 1998, the complete disclosure of which is incorporated herein by reference. For example, when formed as a coupler, the presentation structure 18 is optionally formed having a substantially smooth, part-spherical head 22 of a pressure deformable, resilient elastomeric material, which renders the part-spherical head 22 relatively resiliently radially compressible. Alternatively, the part-spherical head 22 is formed of a substantially rigid material and having a plurality of discrete triangular surfaces as disclosed by example and without limitation in U.S. Pat. No. 6,581,892, entitled "Geodesic Mounting Apparatus," issued to Jeffrey D. Carnevali, the inventor of the present mounting device 10, on Jun. 24, 2003, the complete disclosure of which is incorporated herein by reference. Other presentation structures 17, such as pins, rods or plates as well as proprietary structures, are also contemplated and are considered equivalent structures and are substituted therefore without departing from the scope and intent of the invention.

By example and without limitation, the frame 16 includes a substantially rigid plate 24, and the head 22 of the presentation structure 18 is extended from the plate 24 on a relatively upstanding reduced diameter stem or "neck" 26. By example and without limitation, the plate 24 is formed of a substantially rigid material such as metal or a hard plastic that is injection moldable. The presentation structure 18 is optionally formed as an integral portion of the plate 24. For example, the reduced diameter stem or neck 26 is integrally molded with the plate 24. When the head 22 is formed of a pressure deformable, resilient elastomeric material, as disclosed by U.S. Pat. No. 5,845,885, which is incorporated herein by reference, it is overmolded on the stem 26. Alternatively, the head 22 is optionally integrally molded with the plate 24 when the head 22 is formed of a substantially rigid material as disclosed by U.S. Pat. No. 6,581,892, which is incorporated herein by reference.

The frame 16 is formed with a connector structure 28 for fixedly coupling with the plastically formable composition 20 and becoming embedded therein. The connector structure 28 is illustrated here by example and without limitation as a plurality of grippers 30. The grippers 30 are optionally formed as bent fingers projected from the substantially rigid plate 24, as illustrated here by example and without limitation. Other gripper structures 30, such as pins or rods, are also contemplated and are considered equivalent structures and are substituted therefore without departing from the scope and intent of the invention. Alternatively, the grippers 30 are optionally formed as a plurality of holes 32 formed through the rigid plate 24, as illustrated in one or more subsequent Figures, such gripper holes 32 are also contemplated and are considered equivalent grippers 30 for the connector structures 28 and are substituted therefore without departing from the scope and intent of the invention.

According to one embodiment of the malleable base structure 14 includes the plastically formable composition 20 provided in a balloon-like container or envelope 34 formed of a flexible material, such as plastic or a natural or synthetic rubber. A relatively high plasticity property of the composition 20 renders it conformable to irregular surfaces such as the pronounced and complex contours 2 of different automotive vehicle dashboards 1 and other interior vehicle surfaces, as illustrated in FIG. 1, including the set of louvers 7 often found near the dashboard's forward edge 8 adjacent to where a windshield is positioned. The connector structure 28 is colocated with the plastically formable composition 20 internal of the envelope 34 as to be positioned for being fixedly coupling with the plastically formable composition 20 and becoming embedded therein.

As illustrated here by example and without limitation, substantially the entirety of the frame 16 having the connector structure 28 is sealed within the envelope 34, for example, by a seal 36 around the stem 26 of the presentation structure 18.

The plastically formable composition 20 provided in the envelope 34 preferably has a relatively high plasticity. Plasticity is a property of a wet dough, kneading and modeling compound or clay that permits deformation by application of a relatively slight pressure and retention of the deformed shape after release of the pressure. This property distinguishes the dough in its wet stage from its dry stage. Here, the plasticity of the moldable composition 20 permits it to be molded to substantially match and thus conform to irregular surfaces such as the pronounced and complex contours 2 of different automotive vehicle dashboards 1 and other interior vehicle surfaces, as illustrated in FIG. 1, including for example the set of louvers 7.

The plastically formable composition 20 provided in the envelope 34 is, by example and without limitation, one of a type of compositions that is cohesively strong but of relatively high plasticity being pliable and ductile. Some of these cohesively strong but pliable and ductile compositions 20 retain the property of plasticity for the life of the product, while other such compositions become hardened or rigid through drying, curing, crosslinking or chemical reaction induced by an appropriate catalyst. For example, the plastically formable composition 20 provided in the envelope 34 is, by example and without limitation, any of several well-known for the manual production of plastic representations of all types such as a kneading and modeling compound or clay which compound is constituted of binding agents, plasticizers and/or solvents, as well as fillers, and may also optionally include pigments and other additives. Plastically formable compositions for molding and modeling are generally well-known in principle. Modeling compounds such as clays and putties are widely known and have been commercially available for decades. The compounds are commonly used as play toys, creative materials, and orthopedic aids. Common examples of putties include, for example, borosiloxane bouncing putties shown in U.S. Pat. No. 2,541,851 issued to Wright and U.S. Pat. No. 3,677,997 issued to Kaiser, et al., the complete disclosures of which are incorporated herein by reference. Unlike conventional modeling clays, these compounds do not dry out or harden over time.

Such kneading and modeling compounds or clays are disclosed by example and without limitation in U.S. Pat. No. 4,336,071, entitled "Kneading And Modeling Compound And The Use Thereof," issued to Schnorrer on Jun. 22, 1982, the complete disclosure of which is incorporated herein by reference. Other such kneading and modeling compounds or clays are disclosed by example and without limitation in German Published Patent Applications 24 24 451 and 27 10 115, which teach permanently plasticized kneading compounds which, among others, consist of polyethylene wax or rubber as the binding agents and of organic-synthetic material or again kaolin or other metal oxides as the filler. Another such kneading and modeling compounds or clays is disclosed by example and without limitation in German Laid-open Patent Application 25 15 757, which describes a plastic compound which is deformable by hand and serves for the production of models, motifs and other kinds of plastic representations, wherein the molded components are hardened at elevated temperatures after their completion and can thereby be rendered durable. These compounds or clays essentially consist of binding agents, plasticizers and fillers, wherein there are overwhelmingly employed different types of PVC as the binding agent and kaolin (aluminum silicate) as the filler. Yet another such kneading and modeling compounds or clays is disclosed by example and without limitation in German Published Patent Application 27 10 115, which relates to a kneading compound which is maintained in a plasticized and remoldable condition for lengthy periods of time, and which employs kaolin as a filler material for the compound. Also, an article by G. Schonefeld and J. Walter, GAK May 1974, pages 338 to 342, West Germany, describes the utilization of aluminum hydroxide as a flame-retardant filler for PVC plastisole.

Another kneading and modeling compound or clay that may be useful for practicing the plastically formable composition 20 provided in the envelope 34 is a modeling dough disclosed by example and without limitation in U.S. Pat. No. 5,171,766, entitled "Modeling Dough," issued to Mariano, et al. on Dec. 15, 1992, the complete disclosure of which is incorporated herein by reference, which discloses a water-based modeling dough compound of gelled poly(vinyl alcohol), water and a filler that forms a cohesive water soluble resin system having a relatively high plasticity. The water evaporates upon drying to leave a gelled poly(vinyl alcohol)-filler matrix that is both lightweight and durable and is reported to provide a dough resistant to flaking, cracking, and crumbling. The poly(vinyl alcohol) resin is gelled, thereby providing a water-based resin system that is not sticky yet very ductile. Prior to drying, the dough also exhibits the properties of bounceability and the ability to pick up newsprint. After the dough is air-dried, the poly(vinyl alcohol) resin serves to bind the components into a solid, durable product. The filler accounts for a large portion of the volume of the dough, so the overall volume is not greatly affected by water loss upon drying. Optionally, the composition of the invention may include one or more of a buffer, a defoamer, a wetting agent, a humectant, a preservative, and colorants. Dyes and pigments can be incorporated into the formula. The dried product is sandable, carvable and paintable. When preferred fillers are used, the doughs are reported to have a density that causes it to be substantially lighter than modeling doughs and clays previously available. Further, the doughs are reported to have a very limited amount of dry shrinkage, are extrudable when wet, and are sandable, carvable, and paintable when dry.

In U.S. Pat. No. 5,498,645, entitled "Modeling Dough," issued Mar. 12, 1996, the complete disclosure of which is incorporated herein by reference, Mariano, et al. discloses another modeling dough compound useful for practicing the plastically formable composition 20, which is a polar polymeric resin, water, a gellant, and a filler. The polymeric resin is gelled, which results in a water-based resin plastically formable composition 20 that is not sticky yet very ductile for exhibiting a relatively high plasticity.

U.S. Pat. No. 5,364,892, entitled "Modeling Dough," issued to Miller, et al. on Nov. 15, 1994, the complete disclosure of which is incorporated herein by reference, discloses another kneading and modeling compound or clay that may be useful for practicing the plastically formable composition 20 provided in the envelope 34. Accordingly, by example and without limitation the plastically formable composition 20 is a water-based modeling dough compound of gelled poly(vinyl alcohol), water and a filler that is reported to provide a dough resistant to flaking, cracking, and crumbling. The poly (vinyl alcohol) resin is gelled, thereby providing a water-based resin system that is not sticky yet very ductile. Prior to drying, the dough also exhibits the properties of bounceability and the ability to pick up newsprint. After the modeling dough is air-dried, the poly resin binds the components into a solid, durable product. The filler accounts for a large portion of the volume of the dough, so the overall volume is not greatly affected by water loss upon drying. Dyes and pigments are optionally incorporated into the formula.

In U.S. Pat. No. 5,506,280, entitled "Modeling Dough," issued Apr. 9, 1996, the complete disclosure of which is incorporated herein by reference, Miller, et al. discloses another water-based modeling dough compound that may be useful for practicing the plastically formable composition 20 provided in the envelope 34. After the modeling dough is air-dried, a poly resin binds the components into a solid, durable product.

U.S. Pat. No. 5,873,933, entitled "Malleable Play Material Compound Resembling Loose Soil," issued to Mackey on Feb. 23, 1999, the complete disclosure of which is incorporated herein by reference, discloses another kneading and modeling compound or clay that may be useful for practicing the plastically formable composition 20 provided in the envelope 34. Accordingly, by example and without limitation the plastically formable composition 20 is a malleable play material binder combined with a substantially greater quantity of sand which forms a granular malleable amorphous material having an unusual tactile characteristic. The play material binder may be a conventional play material or may be formed by mixing a soluble cellulose, a polyvinyl alcohol, propylene glycol, water, sodium tetraborate, sodium carbonate and a light mineral oil, whereby the plastically formable composition 20 retains its property of relatively high plasticity.

U.S. Pat. No. 5,873,933 discloses several other compounds that may be useful for practicing the plastically formable composition 20. For example, U.S. Pat. No. 5,258,068 issued to Shapero, et al. sets forth a PLAY MATERIAL COMPOSITION formed of a guar gum, EDTA DOWICIL 200 methylparaben and propylparaben together with a monosodium phosphate calcium buffer; U.S. Pat. No. 4,735,660 issued to Cane sets forth a CROSS-LINKED GEL MODELING COMPOSITION of various colors that is cohesively strong but pliable and ductile formed of a quantity of wood flour combined with a water-based gel using cross linkable guar gum of a gellant; U.S. Pat. No. 5,310,421 issued to Shapero, et al. sets forth a PLAY MATERIAL formed using a self cross-linking sodium alginate combined with germaben II-E and butylparaben preservatives wherein a sodium chloride salt provides further preservative option and increases the firmness of the gel material; U.S. Pat. No. 5,374,384 issued to Berks, et al. sets forth a MODELING MEDIUM formed of a mixture of an organic ductile wax binder and a mica platelet filler which is mechanically worked while the material is in a semi-solid state to evenly distribute the mica platelets throughout the mixture; U.S. Pat. No. 5,506,290 issued to Shapero sets forth a PLASTIC MOLDABLE COMPOSITION providing a cross link gel-like composition of matter based on a cohesive polyvinyl alcohol nonadhesive and substantially nondrying composition that is capable of being used as a modeling compound as well as being moldable, extrudable, stretchable and inflatable into bubbles for use in a play activity; U.S. Pat. No. 3,607,332 issued to Wingfield sets forth a MODELING COMPOSITION providing a thermoplastic modeling compositions having distributed throughout rigid regularly shaped micro particles spheres or platelets which render the modeling compositions relatively soft and easily molded at elevated temperatures and resistant to cracking after having been molded and standing for some time; U.S. Pat. No. 3,384,498 issued to Alurabi sets forth a PLASTIC MODELING COMPOSITION having manogalactan gum, alkali metal borate, boric acid, high molecular weight polysaccharide together with preservatives, colorant and fragrance; U.S. Pat. No. 3,804,654 issued to Liu sets forth a MODELING COMPOSITION including mineral fillers such as clay and talc, hydrocarbon petroleum distillate oil, waxy paraffinic hydrocarbon oil, liquid silicone, which may be shaped and then permanently set; U.S. Pat. No. 3,809,661 issued to Shapero, et al. sets forth MOLDING COMPOSITIONS AND METHOD OF MOLDING as a two-part molding composition and method of forming molded rubber and plastic products therefrom which includes a latex phase to which a gellant phase is added; U.S. Pat. No. 4,336,071 issued to Schnorrer sets forth a KNEADING AND MODELING COMPOUND AND USES THEREOF which is formed of binding agents, plasticizers and/or solvents together with fillers; U.S. Pat. No. 3,634,280 and a continuation-in-part thereof U.S. Pat. No. 3,661,790 both set forth a GLOWING BOUNCING PUTTY which includes a photoluminescent material within a putty; U.S. Pat. No. 3,886,112 issued to Watson, et al.; U.S. Pat. No. 3,632,786 issued to Nickerson; and U.S. Pat. No. 3,135,648 issued to Hawkins set forth various polyvinyl alcohol adhesives; U.S. Pat. No. 4,618,491 issued to Kanematu, et al; U.S. Pat. No. 3,873,485 issued to Fichera; and U.S. Pat. No. 2,541,851 issued to Wright set forth various gel compositions and elastic materials, and in a related art, various combinations of particulate material such as sand are combined with various binders to provide sand cast molds for use in casting material such as metal. For example, U.S. Pat. No. 3,977,236 is issued to Neukom sets forth a CORE BINDER utilizing an alkali metal phosphate modified starch for the core binder; U.S. Pat. No. 4,080,213 issued to Mori, et al. sets forth a SAND MOLD COMPOSITION FOR METAL CASTING including a molding sand and pullulan of a binder therefore that results in advantages of reduced gas, dust, noise and vibration during the pulling and stripping steps; U.S. Pat. No. 4,231,914 issued to Born, et al. sets forth a POLYURETHANE-BASED BINDER SYSTEM FOR THE PRODUCTION OF CASTING MOLDS OR CORES wherein a polyurethane binder is combined with a solvent consisting of an ester having as its acid component an aliphatic dicalboxylic acid; U.S. Pat. No. 4,459,377 issued to Saeki, et al. sets forth a SHELL MOLDING RESIN COATED SAND formed of a phenolic resin binder together with aromatic compounds for use in foundry shell molding applications; U.S. Pat. No. 4,460,716 issued to Saeki, et al. sets forth a COATED SAND COMPOSITION AND METHOD FOR PRODUCING SAME in which a phenolic resin coated sand has improved shake-out properties; U.S. Pat. No. 5,473,009 issued to Kimura, et al. sets forth a MOLD MATERIAL COMPOSITION AND METHOD FOR PREPARING MOLD while U.S. Pat. No. 5,491,180 issued to Kiuchi, et al. sets forth a BINDER COMPOSITION FOR MOLD MAKING, BINDER/CURING AGENT COMPOSITION FOR MOLD MAKING, SAND COMPOSITION FOR MOLD MAKING AND PROCESS OF MAKING MOLD; and U.S. Pat. No. 4,891,266 issued to Keith sets forth a SCULPTING MATERIAL AND METHOD OF MANUFACTURE AND USE providing a quantity of granular material having grains individually coated with paint and a water-resistant binder binding the coated grain together into a side dry carvable block.

Shapero, et al. discloses additional moldable compositions that may be useful for practicing the plastically formable composition 20 and methods of making the same in U.S. Pat. No. 5,916,949 entitled "Moldable Compositions And Method Of Making The Same," issued Jun. 29, 1999, the complete disclosure of which is incorporated herein by reference, wherein the compositions include a binder such as polyvinyl alcohol, solvent for the binder, humectant, wax such as paraffin and microcrystalline waxes, an emulsifier for the wax, filler such as glass microspheres, talc and flour, a cross-linking agent for the binder, and various additives. The binder preferably is. The filler preferably includes glass microspheres, talc and flour. The plastically formable composition 20 is thus similar to toy modeling clay that does not dry out, even if left exposed to air for several days, and are easily rehydrated to replace any water lost from prolonged exposure.

U.S. Pat. No. 5,916,949 discloses several other compounds that may be useful for practicing the plastically formable composition 20, including for example, U.S. Pat. Nos. 4,629,751, 5,157,063, 5,506,280, and 5,506,290, the disclosures of which are incorporated herein by reference, disclose multiple compositions formed from components that meet the general definitions of polyvinyl alcohol, water, gellant, and filler.

U.S. Pat. No. 6,837,924 entitled "Modeling Composition And Its Use," issued to Breindl, et al. on Jan. 4, 2005, the complete disclosure of which is incorporated herein by reference, discloses another modeling compound that may be useful for practicing the plastically formable composition 20, which is a play dough formed of a wax-based and oil-based binder, a coloring agent, and a substantially light filler such as hollow microbeads.

U.S. Pat. No. 6,837,924 discloses several other compounds that may be useful for practicing the plastically formable composition 20. For example, German patent document 297 20 344 U1 and U.S. Pat. No. 3,607,332 describe industrial plastically formable compositions which are used for producing design models in the automobile industry. The light modeling compositions described therein include minerals, binders, light fillers, and color-imparting agents that, after cooling to room temperature, have a final hardness similar to candle wax so that the model formed of this composition becomes more rigid and harder as the temperature decreases. In another example, German patent document 40 08 980 C2 describes plastically formable compositions for kneading, modeling, crafting and decorating containing organic plasticizers, binders, fillers and/or as an additional additive polyalkylmethacrylate (PAMA), in particular, polymethylmethacrylate (PMMA), polyethylmethacrylate (PEMA), polypropylmethacrylate (PPMA) or polybutylmethacrylate (PBMA). Such play dough compositions can be kneaded at room temperature but also harden irreversibly at room temperature and can no longer be worked by a user's hands.

U.S. Pat. No. 6,881,781 entitled "Modeling Compound," issued to Gamba on Apr. 19, 2005, the complete disclosure of which is incorporated herein by reference, discloses another modeling compound that may be useful for practicing the plastically formable composition 20, which is a non-toxic malleable, bounceable modeling compound produced according to a tri-phase process that does not require heating or baking and is stretchable in a manner similar to chewing gum which contains essentially of a butyl rubber, vulcanized vegetable oil, one or more softening agents, an inorganic filler material, antioxidant and binder. The pliable modeling compound can retain a molded shape for years and is reported to be an ideal sculpting material.

U.S. Pat. No. 3,963,677 entitled "Impermeable Silicone Composition," issued to Enger on Jun. 15, 1976, the complete disclosure of which is incorporated herein by reference, discloses a silicone compound that may be useful for practicing the plastically formable composition 20, which is a fluid and ion impermeable, durable, and substantially inert plastic composition containing at least about 50 percent by weight silicone and the remainder of a fluorocarbon and a wax. The fluorocarbon may be chemically combined or suspended as particles in the silicone, and the pores in the product are filled at least partially with a melted wax such as a natural wax like beeswax or a mineral wax as a micro-crystalline wax or even a synthetic wax as polyethylene. This composition or product is polymerized and/or vulcanized in a mold or the shape in which it is to be used with the aid of a catalyst and/or heat. The product also may contain inert fillers such as diatomaceous earth, silica and/or residues of the catalysts used in its vulcanization or final polymerization.

It is well known that silicones including silicone rubber are non-reactive to the fluids of the body, repel water, and have endurance at high and low temperatures. Room temperature vulcanized silicones are known to exhibit water vapor penetration, are soft, have poor abrasive resistance, and are generally weaker than heat vulcanized silicones. Thus the permeability of these silicone compositions is materially reduced by the optional incorporation therein of a wax to fill their pores, and particularly beeswax. However, wax does not strengthen or toughen the composition any. Therefore, polytetrafluoroethylene is optionally added to these silicone compositions in order to improve their resistance to chemical decomposition since it was well known that polytetrafluoroethylene increases the chemical resistance and strength of silicones.

Silicone or polysiloxane is at least 50 percent by weight of the composition of this invention, and can be up to 94 or 95 percent of the weight of the composition, but usually is 60 to 85 percent by weight of the composition. This silicone is usually a polydimethyl silicone type which is generally the best medical grade silicone for implants in the body, however other silicones with a low number of carbon atoms in their side chains for other uses also may be employed. This silicone also is non-reactive to fluids in the body, however, it is highly permeable to electrolytes and operates like an osmotic membrane. The final product is a solid which may be flexible like a rubber, however in producing this composition the silicone is preferably in its liquid state so that the other ingredients may be easily mixed therein, or else it is dissolved in an organic solvent such as toluene or acetone, which solvent is later evaporated off after the moldable composition 20 is conformed to the target vehicle dashboard 1 or other surface. When room temperature vulcanization or polymerization is employed, a catalyst 48 is used, such as stannous octoate, which forms a peroxide to cross-link the chain polymer molecule of silicone resin 46 into a more rigid solid, and the remaining stannous oxide acts as an inert filler in the final composition 20. Alternatively, if used during heat vulcanization, the catalyst 48 is usually dichlorobenzoyl peroxide which in forming the peroxide to produce the cross-linking, and is later evaporated from the composition 20 during the heating.

The silicone rubber composition 20 also may include an inert filler such as fine particles of diatomaceous earth or silica, which particles are micron in size, preferably as small as 0.3 microns but usually around one micron and may be as large as even 50 microns, but mostly below 20 microns. The limit of the amount of filler is determined by the ability to still polymerize or vulcanize the composition 20. Generally the fillers however are only tolerable in minor percentages, i.e., below about 20 percent by weight of the first composition 20.

U.S. Pat. No. 3,996,175 entitled "Storage-stable, Quick-curing Epoxide Resin Moulding Materials," issued to Schreiber, et al. on Dec. 7, 1976, the complete disclosure of which is incorporated herein by reference, discloses another compound that may be useful for practicing the plastically formable composition 20, which is a storage-stable, quick-curing epoxide resin molding material containing: A) epoxide resins 46, B) pre-adducts containing free amino groups and formed from polyamines containing aromatic groups and low-molecular epoxide resins, as curing agents 48, and C) mineral or organic pulverulent or fibrous fillers, with the epoxide resins 46 and the curing agents 48 softening between 45 degrees and 120 degrees C., and having a melting point higher by 5 degrees to 30 degrees C. than the softening point, and being present in the composition 20 predominantly in the form of particles separated from each other.

U.S. Pat. No. 4,042,550 entitled "Encapsulant Compositions Based On Anhydride-Hardened Epoxy Resins," issued to Tuller, et al. on Aug. 16, 1977, the complete disclosure of which is incorporated herein by reference, discloses another compound that may be useful for practicing the plastically formable composition 20, which is an epoxy molding composition containing: (a) an epoxide compound resin 46; (b), a polyanhydride of a maleic monomer and at least one alkyl styrene monomer or prepolymers of the polyanhydride and said epoxide compound as hardener; (c) a catalyst 48; (d) about 1 to 80 percent by weight of a silica filler; (e) about 1 to 80 percent by weight of an additional filler selected from the group consisting of calcined clay, antimony trioxide, antimony tetraoxide, calcium silicate, titanium dioxide, calcium carbonate, zinc oxide, magnesium oxide and mixtures thereof; (f) about 0.05 to 2 percent by weight of a silane coupling agent; and (g) about 0.01 to 2 percent by weight of a lubricant selected from the group consisting of carnauba wax, montanic acid ester wax, polyethylene wax, polytetrafluoroethylene wax and mixtures thereof.

U.S. Pat. No. 4,195,001 entitled "Formulations And Process For Effecting Stoppage Of Leaks Of Liquid From Tanks, Pipes And The Like," issued to Lytton on Mar. 25, 1980, the complete disclosure of which is incorporated herein by reference, discloses a putty compound that may be useful for practicing the plastically formable composition 20, which is a cohesively strong but pliable and ductile composition of two separate compositions, each of which is of generally putty consistency, which are blended together just prior to use to form a product having a putty or putty-like consistency. The two separate compositions, when blended together or admixed for use, contain one or more epoxy resins 46, one or more epoxy curing agents 48, one or more waxes or waxy materials, and one or more fillers, with or without minor proportions of one or more supplemental ingredients.

U.S. Pat. No. 4,195,001, which is incorporated herein by reference, discloses several other compounds that may be useful for practicing the plastically formable composition 20. For example, U.S. Pat. No. 2,623,830, which is incorporated herein by reference, discloses compositions utilizing a wax or waxy material and a drying oil, such as tung oil, which, upon oxidation by air, forms a sealant film, which may be satisfactory for practicing the plastically formable composition 20.

U.S. Pat. Nos. 3,159,499 and 3,160,518, which are incorporated herein by reference, disclose putty compositions for repairing holes, cracks, pits and the like in water pipes, electrical conduits and boat hulls, i.e., repairs in wet surfaces, containing, in a composition A, an amine curing agent 48, filler and pigment; and, in a composition B, a polyepoxide resin 46 and filler, with compositions A and B being combined to produce a putty-like composition. Such compositions may be satisfactory for practicing the plastically formable composition 20.

U.S. Pat. No. 5,066,714 entitled "Curable Organopolysiloxane Putty-Like Composition," issued to Inoue, et al. on Nov. 19, 1991, the complete disclosure of which is incorporated herein by reference, discloses another compound that may be useful for practicing the plastically formable composition 20, which is a cohesively strong but pliable and ductile curable organopolysiloxane putty-like composition containing an organopolysiloxane resin 46 having at least two alkenyl groups in one molecule, an organohydrogenpolysiloxane having at least three≡SiH groups, a catalytic amount of platinum or a platinum compound as the catalyst 48, and an inorganic filler. This composition 20 further contains an organopolysiloxane modified with an alkyl group directly bonded to silicon atoms and having from 7 to 30 carbon atoms, whereby the modified organosiloxane serving as an oil properly exudes prior to curing but does not exude appreciably after the curing. This curable organopolysiloxane putty-like composition remains putty-like prior to curing by the action of an internal releasing agent. Once the composition 20 has been cured, it becomes useful as an impression material without impeding an appearance or lowering the dimensional accuracy because of a reduced degree of bleeding of the internal release agent.

U.S. Pat. No. 5,431,831 entitled "Compressible Lubricant With Memory Combined With Anaerobic Pipe Sealant," issued to Vincent on Jul. 11, 1995, the complete disclosure of which is incorporated herein by reference, discloses a pipe sealant compound that may be useful for practicing the plastically formable composition 20, which is a cohesively strong but pliable and ductile and compressible graphite lubricant having a memory suspended in an anaerobic adhesive pipe sealant mixture of a polymerizable liquid acrylate ester monomer resin 46 and a peroxy polymerization initiator for the catalyst 48. The graphite particles are formed of expanded graphite which gives the pipe sealant both compressibility and lubricating characteristics. The compound has the ability to change from a liquid with sufficient lubricity to assemble standard API and premium threaded connections without galling and then transform and fix itself into a continuous solid blocking or sealing agent in the gaps of the thread form. The expanded (compressible) graphite has a memory and, as part of the anaerobic fixing compound, allows the composition 20 to maintain its sealing integrity under cycling of tension, compression, bending, and thermal expansion and contraction when used as a pipe sealant.

U.S. Pat. No. 5,607,993 entitled "Low-density Bouncing Putty," issued to Christy on Mar. 4, 1997, the complete disclosure of which is incorporated herein by reference, discloses a putty compound that may be useful for practicing the plastically formable composition 20, which is a low density bouncing putty with a borosilicone rubber base mixed with density-reducing filler, for example in the form of thermoplastic microspheres. An optional thinning agent reduces stiffness, and an optional lubricating oil improves handling characteristics. An optional moisture scavenger can be added to maintain the characteristics of the bouncing putty even if some moisture is absorbed over time. An optional polarity modifier such as glycerine can be added to soften the putty composition 20. If desired, an optional colorant can be added as well.

Another putty compound that may be useful for practicing the plastically formable composition 20 is a putty, which is a generic term for a plastically formable material similar in texture to clay or dough typically used in domestic construction and repair as a sealant or filler. Painter's putty is typically a linseed oil based product used for filling holes, minor cracks and defacements in wood only. Putties can also be made intumescent, in which case they are used for fire stopping as well as for padding of electrical outlet boxes in fire-resistance rated drywall assemblies. In the latter case, hydrates in the putty produce an endothermic reaction to mitigate heat transfer to the unexposed side. Glazing putty is traditionally made by mixing a base of whiting (finely ground chalk) with linseed oil in various proportions, however a number of synthetic alternatives exist. Linseed oil putty has been used extensively in glazing for fixing and sealing panes of glass into wooden frames (or sashes), although its use is decreasing with the prevalence of PVC and metal window frames which use synthetic sealants such as silicone.

When used as the plastically formable composition 20, linseed oil putty can be warmed, e.g., in a microwave oven, to increase plasticity; however, this tends to harden the putty. A small amount of raw linseed oil can be added and kneaded into the putty composition 20 to moisten and increase plasticity should it dry or hardened through warming or aging. The linseed oil putty composition 20 is optionally dyed by adding pigments during the kneading process.

Any such plastically formable composition disclosed herein or another appropriate material composition, including linseed oil putty or other putty, may be useful for practicing the plastically formable composition 20 provided in the envelope 34.

FIG. 3 illustrates the novel adaptive mounting device 10 having the envelope 34 substantially filled with the plastically formable composition 20. The adaptive mounting device 10 is placed on the vehicle dashboard 1 or another interior vehicle surface with the malleable base structure 14 seated against the surface and mounting structure 12 facing away. The envelope 34 of the malleable base structure 14 is forcibly conformed to the different complex contours 2 of the dashboard 1 or other surface in a desired position by conforming the moldable composition 20. A portion 38 of the malleable base structure 14 thereafter substantially mirrors the different complex contours 2 of the dashboard 1 or other surface.

When the plastically formable composition 20 in the envelope 34 is one of the type of compositions that is cohesively strong but retains its property of relatively high plasticity, the malleable base structure 14 retains the mirrored contour portion 38 until the plastically formable composition 20 in the envelope 34 is forcibly reformed. While the contour portion 38 retains the mirrored shape of the different complex contours 2, the malleable base structure 14 nests with the different complex contours 2. By blanketing one or more of the peaks 3 and dipping into one or more of the valleys 4, the mirrored contour portion 38 stabilizes the base structure 14 on the dashboard 1. Moreover, the plastically formable composition 20 in the envelope 34 is selected to be sufficiently weighty to press the base structure's mirrored contour portion 38 firmly into the contours 2. Thereafter, the malleable base structure 14 cannot be easily dislodged, except by lifting the adaptive mounting device 10 away from contact with the contours 2.

At a later time, the contour portion 38 of the malleable base structure 14 is optionally differently contoured to mirror a different portion of the dashboard 1 or an entirely different surface having entirely different complex contours 2. Accordingly, the shape of the contour portion 38 is altered by forcibly conforming the envelope 34 of the malleable base structure 14 to the different complex contours 2 by reconforming the moldable composition 20. Thereafter, the portion 38 of the malleable base structure 14 substantially mirrors the different complex contours 2 of the dashboard 1 or other surface.

Alternatively, when the plastically formable composition 20 in the envelope 34 is one of the type of compositions that hardens irreversibly, the malleable base structure 14 retains the molded shape of the mirrored contour portion 38 for years or substantially permanently.

The envelope 34 is a tough and flexibly resilient membrane optionally formed of a high surface friction material, such as a Vinyl or a low durometer polyvinylchloride (PVC) material or another suitable plastic material, which operates as a traction enhancing mechanism 40 between the envelope 34 and dashboard 1 or other target surface to avoid slipping and sliding when the containing vehicle is in motion. Such materials as Vinyl and PVC also have the quality of tending to become softer with increasing temperature so that, when warmed to an interior temperature of the vehicle that is comfortable for the passengers, the surface friction of the envelope 34 increases to more effectively avoid slipping and sliding. Additionally, when the covering of the dashboard 1 or other surface is the vacuum-formed ABS or PVC sheet, foamed sheet, synthetic leather-like materials such as vinyl, leather, imitation leather, textile fabric, or the like disclosed in U.S. Pat. No. 4,663,210, which is incorporated herein by reference, such a molded vehicle dashboard 1 or other surface also have the quality of tending to become softer with increasing temperature so that, when warmed to the interior temperature of the vehicle, the surface friction of the dashboard covering also increases to more effectively avoid slipping and sliding of the mating surface of the envelope 34.

Optionally, the plastic material of the envelope 34 is a substantially optically transparent material such that pigments and other additives, objects or artifacts 42 optionally added to color the plastically formable composition 20 or decorate the base structure 14 are visible.

FIG. 4 illustrates the novel adaptive mounting device 10 positioned on the vehicle dashboard 1 or another interior vehicle surface with the malleable base structure 14 seated against the surface and mounting structure 12 facing away. The envelope 34 of the malleable base structure 14 is forcibly conformed to the set of louvers 7 as well as the different complex contours 2 of the dashboard 1 or other surface by conforming the moldable composition 20. Thereafter the contour portion 38 of the malleable base structure 14 substantially mirrors the different complex contours 2 of the dashboard 1 or other surface. Furthermore, one or more extrusions or "fingers" 44 of the contour portion 38 are extruded into the louvers 7. The mirrored contour portion 38 stabilizes the base structure 14 on the dashboard 1 by blanketing one or more of the peaks 3 and dipping into one or more of the valleys 4 of the contours 2. Moreover, the extrusions 44 of the contour portion 38 extend into the louvers 7 to firmly grip the dashboard 1 or other surface. Thereafter, the malleable base structure 14 cannot be easily dislodged, except by lifting the adaptive mounting device 10 away from contact with the contours 2. Moreover, the weight of the plastically formable composition 20 in the envelope 34 operates to press the base structure's mirrored contour portion 38 into the contours 2 and louvers 7 and further reinforces the surface friction between the envelope 34 and the dashboard 1 or other surface.

Figure 5:
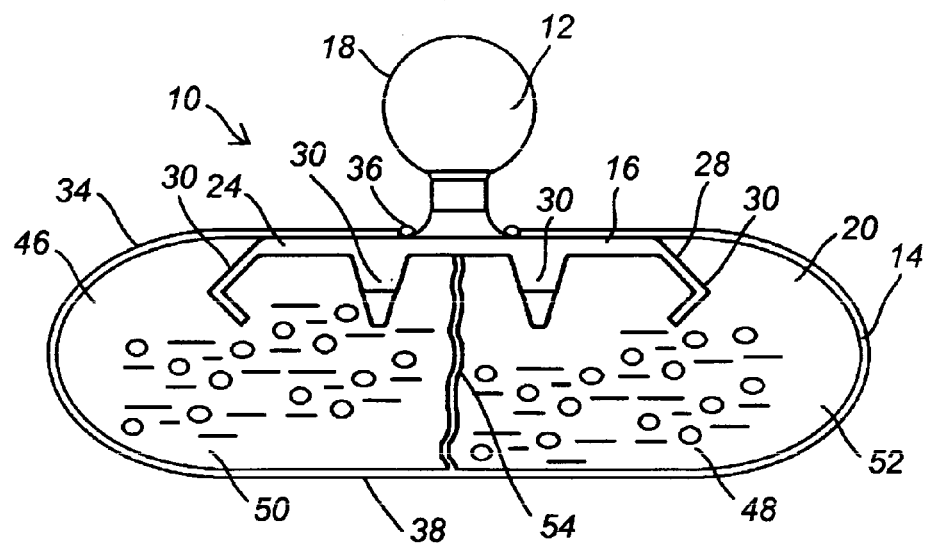
FIG. 5 illustrates the novel adaptive mounting device having the envelope formed with dual chambers separated by a breakable isolation membrane.

FIG. 5 illustrates the novel adaptive mounting device 10 having the envelope 34 of the base structure 14 substantially filled with a natural or synthetic resin 46 in combination with an appropriate catalyst 48 as the plastically formable composition 20. The resin 46 and catalyst 48 are selected to be initially malleable in a separated state. By example and without limitation, the envelope 34 is a dual compartment sealed container having the resin 46 in a first chamber 50 and the catalyst 48 in a second chamber 52. Dual chambers 50 and 52 are separated by a breakable isolation membrane 54.

The resin 46 is by example and without limitation one of the olefinic resins that include ethylenic resins and propylenic resins. For example, as disclosed in U.S. Pat. No. 3,936,403 entitled "Synthetic Resin Composition," issued to Sakaguchi, et al. on Feb. 3, 1976, the complete disclosure of which is incorporated herein by reference, a high density polyethylene is formed from one of the well-known ethylenic resins. The catalyst 48 is, for example, a catalytic system (such as the Phillips or standard type catalyst) mainly consisting of a metal oxide, or another catalytic system (known as the Ziegler type catalyst) mainly consisting of a transition metal compound and organo metal compound (generally organo aluminium compound) which is already widely applied in various fields.

Alternatively, the resin 46 is by example and without limitation one of the propylenic resins. The catalyst 48 is, for example, a catalytic system (known as the Ziegler-Natta type catalyst) mainly consisting of an organo metal compound (generally halogenated alkyl aluminium) and a transition metal compound (for example, titanium trichloride) or an eutectic mixture thereof (for example, a eutectic mixture of titanium trichloride and aluminium chloride [$TiCl_3^{1/3} AlCl_3$]) and is already widely accepted in various fields.

As disclosed in U.S. Pat. No. 3,936,403, the complete disclosure of which is incorporated herein by reference, a synthetic resin composition of olefinic resins, vinyl chloride resins, and alumina trihydrate having a gibbsite crystal structure can be used to form a synthetic resin composition having excellent flameproofness and surface hardness. U.S. Pat. No. 3,936,403 also disclosed that a resin composition having prominent toughness, flame retardance, electrical insulation properties, and resistance to chemicals could be produced by blending ethylenic or propylenic polymers with a relatively large amount (40 to 93 percent by weight based on the total weight of a resin composition) of □-type alumina trihydrate having a gibbsite crystal structure containing at least 0.20 percent by weight of fixed sodium compounds expressed as $Na_2O$, as disclosed in Japanese Patent Applications 28580/72 and 31757/72.

Furthermore, U.S. Pat. No. 3,936,403 disclosed that, in practical application, the synthetic resin composition of this invention is blended with plasticizers such as phthalic acid derivatives, adipic acid derivatives, azelaic acid derivatives, sebacic acid derivatives, maleic acid derivatives, fumaric acid derivatives, trimellitic acid derivatives, citric acid derivatives, oleic acid derivatives, ricinoleic acid derivatives, stearic acid derivatives, derivatives of other fatty acids, sulfonic acid derivatives, phosphoric acid derivatives, other monoester compounds, glycol derivatives, glycerin derivatives, paraffin derivatives, diphenyl derivatives, epoxy derivatives and polymerization type compounds; lubricants such as higher fatty acid esters, amide compounds and higher alcoholic compounds; and stabilizers such as metallic soaps, salts of inorganic acids and organotin compounds. As disclosed in U.S. Pat. No. 3,936,403, these plasticizers, lubricants and stabilizers are used for common vinyl chloride resins.

As disclosed in U.S. Pat. No. 4,148,122 entitled "Method For Repairing Vehicle Bodies," issued to Phillips, et al. on Apr. 10, 1979, the complete disclosure of which is incorporated herein by reference, a hardenable plastic filler can be produced using a resin 46 selected from the class of polyester resins and filler and mixed with the appropriate catalyst 48, or the resin 46 selected from the class of epoxy resins and filler mixed with the appropriate catalyst 48.

U.S. Pat. No. 4,246,157 entitled "Binder Compositions Containing Phenolic Resins And Organic Phosphate And/Or Carbonate Solvents," issued to Laitar on Jan. 20, 1981, the complete disclosure of which is incorporated herein by reference, discloses optional binder compositions that may be used for the plastically formable composition 20. By example and without limitation, the resin component 46 is (A) a phenolic resin including at least one resole or novolak resin, solvent comprising a mixture of (1) hydrocarbon solvent and (2) polar organic solvent containing at least sufficient organic phosphate and/or carbonate ester to increase the curing speed and solubility of the phenolic resin component, (B) an isocyanate component having a functionality of two or more and (C) sufficient catalyst 48 to catalyze substantially completely the reaction between components (A) and (B). Alternatively, the plastically formable composition 20 is a moldable composition comprising aggregate material, such as foundry sand, and such binder compositions and foundry cores or molds made therefrom and including a process for their manufacture from the moldable compositions by either "cold box" or "no-bake" procedures.

Additionally, U.S. Pat. No. 4,246,157, which is incorporated herein by reference, discloses binders or binder systems that have rapid curing times and exhibit uniform curing properties and good thermal and dimensional stability. Such binders or binder systems are normally prepared from a mixture of an aggregate material, such as sand, and a binding amount of a binder or binder system. Typically, after the aggregate material and binder have been mixed, the resulting mixture is rammed, blown or otherwise formed to the desired shape or patterns and then cured with the use of catalysts and/or heat to a solid, cured state. As disclosed in U.S. Pat. No. 4,246,157, many of the known binders or binder systems prepared with aggregate material, such as sand, and a binding amount of a binder, such as polymerizable or curable material, possess the required properties mentioned above.

Some binder systems, such as for example phenol-formaldehyde benzylic ether resin systems are utilized in processes, commonly referred to as "cold box" processes which are accomplished by passing gaseous catalyst 48 through molded sand coated with resin 46 at ambient temperatures in order to achieve curing. In such systems, the resinous material is generally dissolved in a solvent and the type of solvent used affects curing speed and tensile strength. "Cold box" binders and processes as well as solvents employed therein are disclosed in U.S. Pat. Nos. 3,905,934 and 3,409,579, the complete disclosures of which are incorporated herein by reference.

"No-bake" binder systems do not require gassing or heating in order to bring about curing or hardening. Typical "no-bake" polyurethane binding systems of this type are disclosed in U.S. Pat. Nos. 3,499,861; 3,676,392 and 3,686,106, the complete disclosures of which are incorporated herein by reference.

U.S. Pat. No. 4,737,538 entitled "Polymer Concrete Compositions," issued to Halper, et al. on Apr. 12, 1988, the complete disclosure of which is incorporated herein by reference, discloses an optional room temperature atmosphere pressure polymer concrete moldable composition that may be used for the plastically formable composition 20. By example and without limitation, the resin component 46 is a thermosetting resin, vinyl monomer, filler, a rubber component and the catalyst 48.

U.S. Pat. No. 3,981,342 entitled "Puncture Sealing Composition And Tire," issued to Farber, et al. on Sep. 21, 1976, the complete disclosure of which is incorporated herein by reference, discloses an optional moldable composition that may be used for the plastically formable composition 20. By example and without limitation, the resin component 46 is a composition based on a major proportion of low molecular weight liquid elastomer with a minor proportion of a high molecular weight elastomer. Here, the catalyst 48 is a crosslinking agent provided in an amount sufficient to cause partial crosslinking (curing) to prevent flow. In partially curing the mixture 15, the crosslinks are more effective in the high molecular weight elastomer, thus allowing it to act as a supporting structure or skeleton to retard flow, without effectively crosslinking the low molecular weight elastomer. Here, the component 46 is a mixture of low molecular weight liquid elastomer with a high molecular weight elastomer, and the catalyst 48 is a crosslinking agent in sufficient quantity to partially crosslink the component mixture 46. One example of the component 46 of the composition 20 is a blend of depolymerized natural rubber and cis-polyisoprene, partially crosslinked by the action of tetra-n-butyl titanate operating as the catalyst 48 so as to provide a partial gel content.

The high molecular weight elastomeric component of the component mixture 46 may be any high molecular weight solid elastomer capable of being crosslinked. Examples are the highly unsaturated rubbers such as those based on conjugated diolefins, whether homopolymers as in polyisoprene, polybutadiene, polychloroprene (neoprene), or copolymers as exemplified by those having a major proportion of such conjugated dienes as butadiene with a minor proportion of such monoethylenically unsaturated copolymerizable monomers as styrene or acrylonitrile. Alternatively, elastomers of low unsaturation may be used, notably butyl type rubbers, or the EPDM types. Even saturated elastomers such as EPM or ethylene-vinyl acetate may be employed, using the proper cure system.

The low molecular weight elastomer component of the component mixture 46 is preferably of the "liquid" rubber type. Examples are: liquid cis-polyisoprene, liquid polybutadiene, liquid polybutene, liquid EPDM, and liquid butyl rubber. The high molecular weight, elongation and film strength of cis-polyisoprene (both natural and synthetic) and great tackiness of depolymerized cis-polyisoprene give a combination of these two elastomers, when partially cured, a large degree of resistance to flow.

The crosslinking agent or catalyst 48 is any suitable substance or combination of substances capable of curing or gelling the component mixture 46 to the desired extent. Examples are disclosed in U.S. Pat. No. 3,981,342, which is incorporated herein by reference.

The proportion of the low molecular weight elastomer to the high, and the amount and kind of crosslinking agent are chosen so as to give an initial viscosity at room temperature that permits the composition 20 to flow when it is compressed.

Another alternative of the composition 20 is disclosed in U.S. Pat. No. 4,145,477 entitled "Rigidized Acrylic Articles And Method," issued to Smiley on Mar. 20, 1979, the complete disclosure of which is incorporated herein by reference, which discloses compositions which cure at room temperature wherein the resin 46 is an acrylic polymer dissolved in an acrylic monomer, a cross-linking monomer, hydrated alumina, fibrous reinforcement, and the catalyst 48 is a free radical catalyst and a catalyst promoter for use in rigidizing acrylic sheet and gel coats.

The acrylic polymer is polymerized from any lower alkyl methacrylate, mixture thereof, or mixtures with other ethylenically unsaturated compounds such as vinyl acetate, styrene, alkyl acrylates, multifunctional monomers such as alkylene dimethacrylates or diacrylates, etc. In addition, a minor amount of an unsaturated acid such as acrylic acid or methacrylic acid is included in the mixture which copolymerizes with the other monomer or monomers, which promotes wetout of the alumina hydrate and facilitate the use of larger amounts of this flame-retardant additive. The time to gel is typically about 15 minutes, and time to completely cure is about 1 to 2 hours. The rigidizing system typically whitens when it is cured.

U.S. Pat. No. 4,228,060 entitled "Polymerization Of Acetylene," issued to Pez on Oct. 14, 1980, the complete disclosure of which is incorporated herein by reference, discloses a process for producing partially crystalline polyacetylene in the cis or trans configurations for the composition 20 utilizing mu-(eta$^1$:eta$^5$-cyclopentadienyl)-tris(eta-cyclopentadienyl) dititanium(Ti—Ti) as the catalyst 48. U.S. Pat. No. 4,228,060 also discloses polyacetylene "gels" formed of a solid polyacetylene and gel-forming liquid therefor, also containing the catalyst 48, which is used for production of the polyacetylene. The gels are stable to phase separation at room temperature in a closed system, and are useful in preparing randomly and partially chain-aligned polyacetylene articles.

U.S. Pat. No. 4,579,921 entitled "Process For The Manufacture Of Polyacetylene," issued to Gouarderes, et al. on Apr. 1, 1986, the complete disclosure of which is incorporated herein by reference, discloses a process for polymerization of acetylene and of the derivatives thereof by a supported catalyst 48 of the Ziegler type. This catalyst 48 is in suspension in a liquid medium at room temperature. The polyacetylene can be obtained in the form of film, gel, or powder.

U.S. Pat. No. 5,104,930 entitled "Polyurea Gel Compositions And Articles Therefrom," issued to Rinde, et al. on Apr. 14, 1992, the complete disclosure of which is incorporated herein by reference, discloses crosslinkable gel compositions which cure rapidly to provide gel compositions 20 which possess superior combinations of chemical and physical properties and aging resistance. These compositions 20 are molded and cured at room temperature.

U.S. Pat. No. 5,145,933 entitled "Organosiloxane Gel-Forming Compositions And Use Thereof," issued to Grisoni, et al. on Sep. 8, 1992, the complete disclosure of which is incorporated herein by reference, discloses non-friable siloxane gels which can be used for gel compositions 20 are made from compositions of the resin 46 being (A) alkenyl-containing polydiorganosiloxanes; (B) hydrosilicon compounds having at least 3 Si—H groups; (C) SiH end-blocked polydiorganosiloxanes, and (D) the catalyst 48. These compositions 20 cure rapidly at room temperature having a ratio (RHAlk) of SiH: Si-Alkenyl of from 3:1 to 20:1, the percentage of silicon-bonded H atoms provided by (C) not being less than 81.36-(3.6 □ RHAlk) and having a value of from 10 percent to 90 percent. Gel properties are retained by curing the composition 20 according to G.B. Patent Specification 1 582 081, the complete disclosure of which is incorporated herein by reference.

U.S. Pat. No. 5,412,069 entitled "Two-Part Polysulfide Molding Composition And Process," issued to LeCompte, et al. on May 2, 1995, the complete disclosure of which is incorporated herein by reference, discloses two-part liquid polysulfide compositions 20 which utilize stable and effective manganese dioxide or like curing agents as catalyst 48 which provide reasonable working times and gel times typically a maximum of 90 minutes and desirably rapid cure rates. Also, provided are stable and effective manganese curing compositions suitable for use as an element of such two-part liquid polysulfide compositions. Here, the resin 46 is the polysulfide part of the compositions 20 and is provided, by example and without limitation, as a low viscosity liquid polysulfide having a small amount of crosslinking.

Optionally an effective amount of a plasticizer or combination of plasticizers which are compatible with the liquid polysulfide component are added, providing desired low viscosity. Other options include adding an amount of a retarding agent to slow cure rate of the composition 20 as desired; adding elemental sulfur; and adding an effective amount of carbon or other pigment to pigment the composition.

U.S. Pat. No. 5,665,809 entitled "Extruded silicone gel profiles," issued to Wojtowicz on Sep. 9, 1997, the complete disclosure of which is incorporated herein by reference, discloses a method of making simple or complex extruded gel and created articles that is optionally used as the composition 20. In one example, the method involves the extrusion of a silicone gel composition through a die into a heated fluid to complete the cure of the gel as well as to produce the desired gel profile shape. Shapes such as stars, trapezoids, cusped squares, cusped triangle, triangles and the like can be fabricated according to the method.

As disclosed by U.S. Pat. No. 5,665,809, silicone based materials run the gamut from liquids such as silicone oils to hard Shore A durometer rated silicone rubbers, e.g., silicone gaskets. Towards the softer end of this spectrum are materials known as silicone gels which are below the measurement range of the Shore A durometer, but may be characterized by cone penetration (ASTM D217) or by Voland hardness. These systems can be formed in a number of ways. One method synthesizes the crosslinked polymer in the presence of an extender fluid, e.g., a non-reactive silicone oil, or an excess of a vinyl rich liquid silicone compound to create a soft fluid-extended system. Silicone gels generally have Voland hardness of about 1 to 25 grams and elongations greater than 300 percent and often substantially greater than 500 percent, e.g., greater than 1000 percent. Alternatively, silicone gel systems can be fabricated from mixtures of vinyl-containing polysiloxanes and hydride-containing polysiloxanes such that the final product has the appropriate hardness, elongation and tensile properties characteristic of a silicone gel. Suitable examples of both types of gels are taught in, inter alia, U.S. Pat. Nos. 4,600,261; 4,634,207; 5,140,746; 5,357,057; 5,079, 300; 4,777,063; 5,257,058; 3,020,260; and Sylgard 527. Each of the preceding patents are completely incorporated herein by reference for all purposes.

U.S. Pat. No. 4,824,616 teaches making elastomer-skinned silicone gel particles by a two-step process involving (a) delivery of a silicone based material through a nozzle kept at very low temperature into a heated water bath optionally including a surfactant, and (b) forming an elastomeric layer on the surface of the silicone. gel particle. In particular, U.S. Pat. No. 4,824,616 mentions but does not exemplify that it is possible to crosslink the surface of a silicone gel particle bypassing it through a solution of organohydrogenpolysiloxane in a heat transfer medium, such as a silicone fluid. U.S. Pat. No. 5,124,090 teaches making silicone gel spheres by the delivery of a silicone based material through a nozzle, kept at very low temperature, into a heated water bath optionally including a surfactant.

The need to maintain a low viscosity of the mixed precursor materials in U.S. Pat. Nos. 4,824,616 and 5,124,090 requires mixing and storage temperatures of −60 degree C. to +5 degree C. and preferably −10 degree C. However, no teaching is given which indicates that angular complex shapes, as opposed to simple filament-like shapes, can be extruded. Neither of the above mentioned patents teaches the benefits of utilizing a higher temperature heat transfer medium, e.g., silicone oil, which enhances the processability and the rate of article formation. Most notably absent in the patent is the appreciation and the benefits of handling tacky gels through the use of a heated silicone oil bath, as well as examples on how to effectively use such a medium. Additionally, there is no recognition of the need for higher viscosities to create complex extruded shapes or how to achieve higher viscosities through the use of accelerators such as a catalyst and/or an increase in the reaction temperature, or the addition of fillers, or combinations thereof.

U.S. Pat. No. 4,783,289 teaches a process for the molding of silicone rubber compositions. Whereas the hardness of the products of the present invention is below the measurement limits of the Type A Shore Durometer, the hardness of the products described in U.S. Pat. No. 4,783,289 is readily measurable using such an apparatus. The tensile strength of the products exemplified in U.S. Pat. No. 4,783,289 ranges between 560-1420 psi and the elongation-to-break of the products range between 60-700 percent. The elongation of an article described in U.S. Pat. No. 4,783,289 increases with tensile strength. For example, an article with a tensile strength of 560 psi exhibits 60 percent elongation, whereas an article with a tensile strength of 1420 psi exhibits 600 percent elongation. By contrast, the products of the present invention exhibit tensile strength less than 20 psi, preferably less than 10 psi and most preferably less than 5 psi and elongation-to-break greater than 300 percent and often substantially greater than 500 percent, e.g., greater than 1000 percent even at tensile strengths less than 5 psi. In general, the products of the present invention are mechanically less robust than those described in U.S. Pat. No. 4,783,289.

U.S. Pat. No. 5,679,734 entitled "Silicone Composition Which Can Be Crosslinked Into An Adhesive Gel," issued to Peccoux, et al. on Oct. 21, 1997, the complete disclosure of which is incorporated herein by reference, discloses silicone compositions useful for the compositions 20, which can be crosslinked into an adhesive gel by hydrosilylation at room temperature, as well as to the gels thus obtained. Here, the silicone compositions easily and rapidly produce gels having viscoelastic qualities, low-temperature physical stability and adhesion properties by virtue of the compositions comprising: a polyorganosiloxane POS (I) of the SiVi type (Vi=vinyl); a POS (II) of the SiH type; an extender POS (III) of the □, □-hydrogen, SiH type; and, optionally, a diluent POS (IV) of the polydimethylsiloxane type.

U.S. Pat. No. 6,127,504 entitled "Curable Compositions And Cured Gel Parts Thereof," issued to Fukuda, et al. on Oct.

3, 2000, the complete disclosure of which is incorporated herein by reference, discloses a linear polyfluoro compound as the composition 20 having at least two alkenyl groups as a base component forming the resin 46 is blended with a linear polyfluoro compound having one alkenyl group and a hydrosilyl-bearing linear polysiloxane having fluoroalkyl substituents in side chains and at ends thereof. With a platinum catalyst added as the catalyst 48, there is obtained a curable composition 20 having storage stability which will quickly cure into satisfactory gel products.

U.S. Pat. No. 6,169,155 entitled "Silicone Gel Composition And Silicone Gel Produced Therefrom," issued to Alvarez, et al. on Jan. 2, 2001, the complete disclosure of which is incorporated herein by reference, discloses a silicone gel composition for use as the composition that is (A) a first polydiorganosiloxane containing an average of at least two silicon-bonded alkenyl groups per molecule and having a viscosity of from 0.2 to 10 Pa·s at 25 degree C.; (B) at least about 0.5 part by weight of a second polydiorganosiloxane containing an average of at least two silicon-bonded alkenyl groups per molecule, wherein the second polydiorganosiloxane has a viscosity at 25 degree C. of at least four times the viscosity of the first polydiorganosiloxane at degree C.; (C) an organohydrogensiloxane having the average formula $R^7Si(SiOR^8{}_2H)_3$ wherein $R^7$ is an alkyl group having 1 to 18 carbon atoms or aryl, $R^8$ is an alkyl group having 1 to 4 carbon atoms, in an amount sufficient to provide from 0.1 to 1.5 silicon-bonded hydrogen atoms per alkenyl group in components (A) and (B) combined; and (D) a hydrosilylation catalyst as the catalyst 48 in an amount sufficient to cure the composition 20 into a silicone gel composition.

U.S. Pat. No. 6,884,822 entitled "Sol-Gel Process Utilizing Reduced Mixing Temperatures," issued to Wang, et al. on Apr. 26, 2005, the complete disclosure of which is incorporated herein by reference, discloses a method of manufacturing a xerogel monolith as the composition 20 having a pore diameter distribution that includes preparing a first solution comprising metal alkoxide as the resin 46 and preparing a second solution comprising the catalyst 48. The composition 20 is prepared by mixing together the resin 46 and the catalyst 48. At least one of the resin 46, catalyst 48, and composition 20 is cooled to achieve a mixture temperature for the composition 20 which is substantially below room temperature, wherein the composition 20 has a significantly longer gelation time at the mixture temperature as compared to a room temperature gelation time for the composition 20. The method further includes allowing the composition 20 to gel, thereby forming a wet gel monolith, and forming the xerogel monolith as the composition 20 by drying the wet gel monolith.

U.S. Pat. No. 7,067,570 entitled "One-Part Organopolysiloxane Gel Composition," issued to Ikeno, et al. on Jun. 27, 2006, the complete disclosure of which is incorporated herein by reference, discloses another composition that may be suitable for the composition 20. Here, the composition 20 is a one-part polysiloxane composition of a resin 46 of branched organopolysiloxane with vinyl groups bonded to silicon atoms, an organohydrogenpolysiloxane with at least two hydrogen atoms bonded to molecular chain terminal silicon atoms within each molecule, and the catalyst 48 as a platinum based catalyst, together with an additional phosphite triester and an organic peroxide, whereby the resin 46 is resistant to increases in viscosity, and does not gel, even on extended storage at room temperature. Even after long term storage stability at room temperature, the characteristics of the cured gel composition 20 are unchanged.

Figure 6:
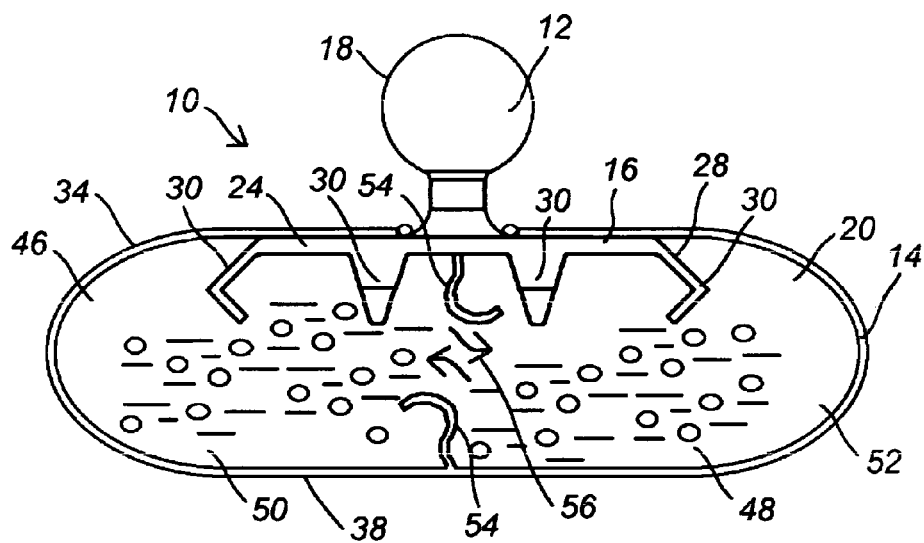
FIG. 6 illustrates breaking of the breakable isolation membrane separating the dual chambers of the envelope and mixing of an appropriate catalyst with a hardenable resin.

FIG. 6 illustrates breaking of the breakable isolation membrane 54 separating dual chambers 50 and 52 of the envelope 34. Upon breaking of the membrane 54 the appropriate catalyst 48 is introduced into the synthetic resin 46, and the resin 46 combines with the catalyst 48, as indicated by the arrows at 56. When the resin 46 and catalyst 48 are substantially liquid in form, the resin 46 flows into the catalyst chamber 52 while the catalyst 48 flows into the resin chamber 50 to form the plastically formable composition 20. The composition 20 remains substantially plastically formable until chemical reaction between the resin 46 and catalyst 48 causes the composition 20 to set. During this plastically formable period, the base structure 14 remains sufficiently malleable that the envelope 34 is able to be forcibly conformed to the different complex contours 2 of the dashboard 1 or other surface in a desired position by deforming the moldable composition 20. Upon setting of the composition 20 the portion 38 of the previously malleable base structure 14 of the adaptive mounting device 10 substantially mirrors the different complex contours 2 of the dashboard 1 or other surface.

When one or both of the resin 46 and catalyst 48 is initially substantially gelatinous or pasty or putty-like, the resin 46 and catalyst 48 are mixed by kneading them together in the envelope 34 after the isolation membrane 54 separating them is broken. Thereafter, the base structure 14 remains sufficiently malleable that the envelope 34 is able to be forcibly conformed to the different complex contours 2 of the dashboard 1 or other surface in a desired position by deforming the moldable composition 20.

Figure 7:
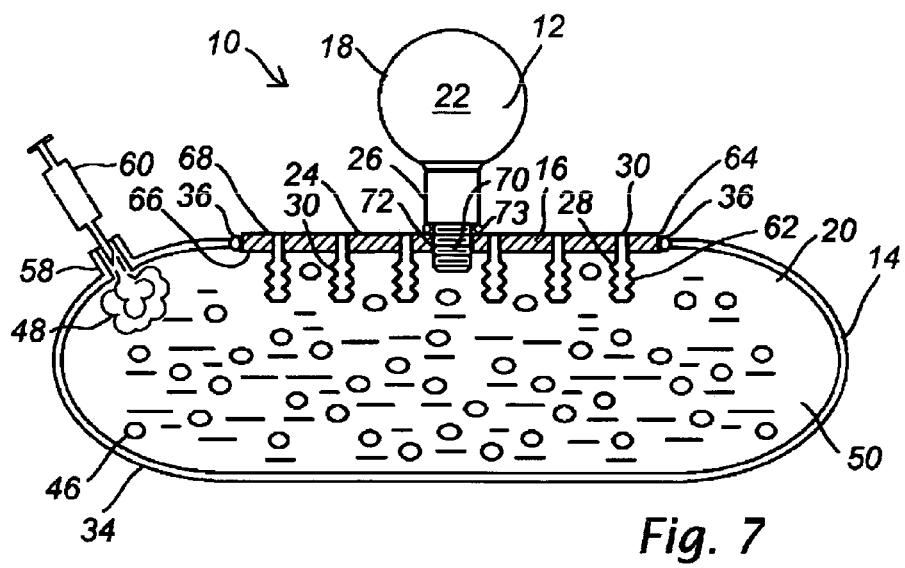
FIG. 7 illustrates the novel adaptive mounting device having the envelope formed with a single undivided chamber having a hardenable resin therein and re-sealable portal for introducing the appropriate catalyst into the resin.

FIG. 7 illustrates another means for introducing the appropriate catalyst 48 into the synthetic resin 46 through a sealed and re-sealable portal 58 into the undivided first single-chamber 50 of the envelope 34. Here, the appropriate catalyst 48 is provided in a container 60, such as a syringe, separate from the envelope 34. The re-sealable portal 58 is optionally of a manually re-sealable type with a an attached plug sized to fill a reinforced tube formed on the envelope 34, such as those commonly found on beach balls. Alternatively, re-sealable portal 58 is optionally of a self re-sealing type with a piercable membrane backed on the inside of the envelope with a flap that is forced into position over the pierced membrane by the internal pressure of the moldable composition 20 contained therein. Other re-sealable portals 58, such as a patch adhered to the envelope 34, are also contemplated and are considered equivalent structures and are substituted therefore without departing from the scope and intent of the invention.

The syringe container 60 is operated to inject a measured amount of the appropriate catalyst 48 through the re-sealable portal 58 into the single-chamber 50 of the envelope 34 containing the resin 46. Thereafter, the portal 58 is re-sealed, and the resin 46 and catalyst 48 are mixed, by kneading if appropriate. Thereafter, the base structure 14 remains sufficiently malleable that the envelope 34 is able to be forcibly conformed to the different complex contours 2 of the dashboard 1 or other surface in a desired position by deforming the moldable composition 20. Upon setting of the composition 20 the portion 38 of the previously malleable base structure 14 of the adaptive mounting device 10 substantially mirrors the different complex contours 2 of the dashboard 1 or other surface.

Figure 8:
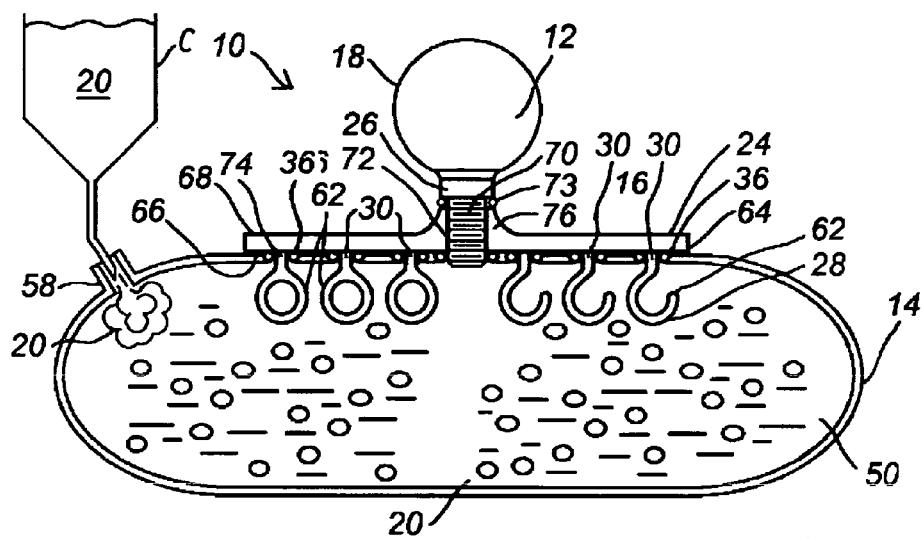
FIG. 8 illustrates the novel adaptive mounting device having a connector structure being optionally formed as a plurality of anchor-type grippers.
Figure 9:
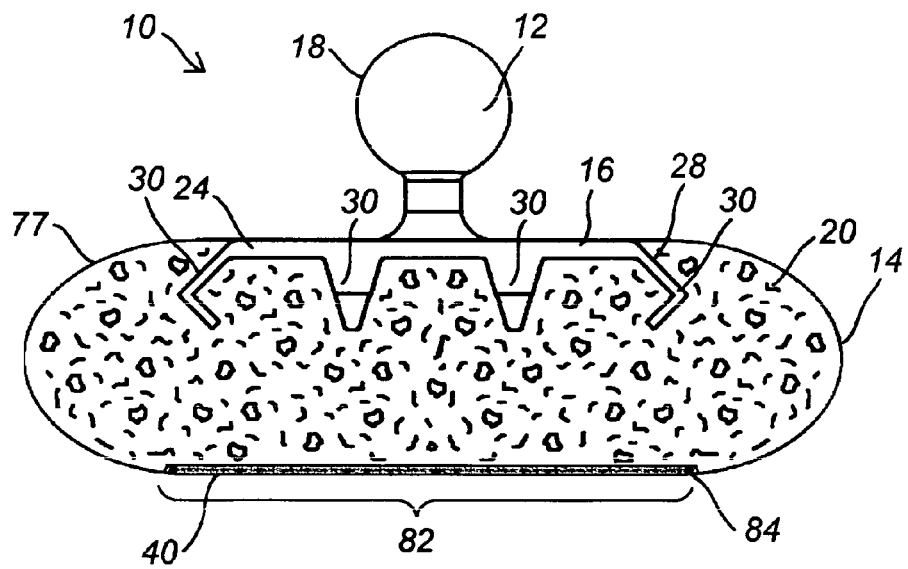

An equivalent of the connector structure 28 is illustrated by example and without limitation for fixedly coupling with the plastically formable composition 20 and becoming embedded therein. The plurality of grippers 30 of the connector structure 28 is illustrated here by example and without limitation as a plurality of pins or rods substantially permanently fixed in the rigid plate 24 of the frame 16 and projected therefrom into the envelope 34. The grippers 30 are optionally formed with one or more anchors 62, as illustrated here by example and without limitation. The anchors 62 are provided as any knurling, threads, knobs or other upset of the gripper 30 that provides anchorage for the moldable composition 20. Other anchor structures 65, such as hooks as illustrated in FIG. 8, are also contemplated and are considered equivalent structures and are substituted therefore without departing from the scope and intent of the invention. The connector structure 28 is colocated with the plastically formable composition 20 internal of the envelope 34 as to be positioned for being fixedly coupling with the plastically formable composition 20 and becoming embedded therein.

As illustrated here by example and without limitation, the seal 36 is optionally formed around a periphery 64 of the plate 24 of the frame 16 such that an internal portion 66 of the frame 16 having the connector structure 28 is sealed within the envelope 34, while an external portion 68 of the frame 16 having the presentation structure 18 is exposed external to the envelope 34.

As illustrated here by example and without limitation, the neck 26 of the presentation structure 18 includes a threaded portion 70 that is threadedly engaged with a mating threaded hole 72 into or through the plate 24 of the frame 16. This and other means for attaching the presentation structure 18 to the plate 24 of the frame 16 are also contemplated and are considered equivalent structures and are substituted therefore without departing from the scope and intent of the invention. Optionally, a sealing mechanism 73, such as an O-ring, is provided between the neck 26 of the presentation structure 18 and the plate 24 of the frame 16. Accordingly, the catalyst 48 is optionally introduced into the resin 46 through the hole 72 when it extends entirely through the plate 24 into the envelope 34.

FIG. 8 illustrates the plurality of grippers 30 of the connector structure 28 having one or more of the anchor 62 being optionally formed as a hook (right) or an eye (left), as discussed in regard to FIG. 7. Here, the seal 36 is optionally formed around a base 74 of each of the anchors 62 adjacent to the plate 24 of the frame 16 such that the plate 24 is substantially exposed external to the envelope 34, while the connector structure 28 is substantially completely colocated with the plastically formable composition 20 internal of the envelope 34.

Here, also, the plastically formable composition 20 is illustrated as being injected or otherwise introduced into the envelope 34, as from a container C such as a hopper. By example and without limitation, the plastically formable composition 20 is injected after the envelope 34 is bonded to the mounting structure 12, which bonding is accomplished for example, by forming the seal 36 between the envelope 34 and the connector structure 28, as illustrated here, or the plate 24 of the frame 16 as illustrated in FIG. 7, or the stem 26 of the presentation structure 18 as illustrated in FIG. 2, or by other means that are also contemplated and are considered equivalent structures and are substituted therefore without departing from the scope and intent of the invention. The plastically formable composition 20 is injected by example and without limitation through the portal 58, which is thereafter sealed or re-sealed.

As illustrated here by example and without limitation, the plate 24 of the frame 16 is formed with a projection or boss 76, with the threaded hole 72 formed into or through the boss 76 and plate 24. The threaded portion 70 of the neck 26 of the presentation structure 18 is threadedly engaged with a mating threaded hole 72. This and other means for attaching the presentation structure 18 to the plate 24 of the frame 16 are also contemplated and are considered equivalent structures and are substituted therefore without departing from the scope and intent of the invention. Optionally, the sealing mechanism 73 is provided between the neck 26 of the presentation structure 18 and the boss 76 on plate 24 of the frame 16. Accordingly, the plastically formable composition 20 is optionally injected or otherwise introduced into the envelope 34 through the hole 72 when it extends entirely through the boss 76 and plate 24 into the envelope 34. Additionally, when the composition 20 is an aerobic or air-curable composition, air is introduced into the composition 20 by opening the seal 73, for example, by removing the presentation structure 18 until the composition 20 is cured.

FIGS. 9-14 illustrate another method of manufacturing the adaptive mounting device 10 when the plastically formable composition 20 is one of the type that is cohesively strong, internal adhesion permits the composition 20 to retain its shape without being contained in the envelope 34 or other containment structure. The kneading and modeling dough or clay are such compositions 20 that are self-binding to a degree that retains shape without appreciable slumping. Alternatively, oil-based putty and some gels, such as silicone gels, are such self-binding compositions 20. Accordingly, in FIG. 9 the connector structure 28 on the frame 16 of the mounting structure 12 is initially embedded in the self-binding composition 20 of the malleable base structure 14, and the self-binding composition 20 is formed into a desired shape. Alternatively, the self-binding composition 20 of the malleable base structure 14 is formed over the connector structure 28 on the frame 16 of the mounting structure 12. When the composition 20 is of the self-binding type, such as but not limited to an oil-based putty, the adaptive mounting device 10 is optionally substantially complete after the connector structure 28 portion of the frame 16 is at least partially embedded in the composition 20. Thereafter, the device 10 is usable for effectively mounting and securing objects in a quick and efficient manner by conforming a base portion 82 of the malleable base structure 14 to such surfaces as the pronounced and complex contours 2 of the automotive vehicle dashboard 1.

Optionally, the base portion 82 of the malleable base structure 14 includes the traction enhancing mechanism 40 as a friction enhancing agent 84 provided as a component of the composition 20 or partially embedded in the composition 20. The friction enhancing agent 84 improves traction to avoid slipping and sliding of the mating surface of the base structure 14 on the covering of the dashboard 1 or other surface. By example and without limitation, the friction enhancing agent 84 is amorphous fumed silica, at least partially dispersed in least the base portion 82 of the envelope 34. Such dispersion of a friction enhancing agent such as amorphous fumed silica is disclosed by U.S. Pat. No. 6,067,731, which is incorporated herein by reference. Other traction enhancing mechanism 40 are also contemplated and are considered equivalent structures and are substituted therefore without departing from the scope and intent of the invention. By example and without limitation, the traction enhancing mechanism 40 is provided as a traction pad 88 provided on the base portion 82 of the malleable base structure 14, as discussed herein. By example and without limitation, the traction pad 88 is formed of a high surface friction material, such as a Vinyl or a low durometer polyvinylchloride (PVC) material or another suitable plastic material. The traction pad 88 is optionally formed with traction enhancing protrusions 86 as any of a plurality of ridges, knobs, bumps, ribs, swirls, waffling or other protrusions or texturing, as discussed herein. Alternatively, the traction enhancing protrusions 86 are optionally provided as discrete bits or strips of such material, rather than a pad. These and other traction enhancing mechanism 40 are also contemplated and are considered equivalent structures and are substituted therefore without departing from the scope and intent of the invention.

Optionally, the self-binding composition 20 of the malleable base structure 14 is instead formed entirely from an open cell foam material, such as polyurethane, having a self-skinning characteristic, so that an external skin 77 forms during curing of the foam material and provides the external surface of the malleable base structure 14, as well the surface that contacts the frame 16. The malleable base structure 14 is thus formed and attached with the frame 16 in a simple one-step operation.

U.S. Pat. No. 6,012,452 entitled "Laryngeal Mask Assemblies," issued to Pagan on Jan. 11, 2000, the complete disclosure of which is incorporated herein by reference, discloses one such composition having a self-skinning characteristic that may be suitable for the composition 20, wherein the material is an open cell foam material, such as polyurethane. Other compositions having such self-skinning characteristic that may be suitable for the composition 20 are also known and contemplated and are considered equivalent structures and are substituted therefore without departing from the scope and intent of the invention. For example, U.S. Pat. No. 5,370,831 entitled "Method Of Molding Polymeric Skins For Trim Products," issued to Blair, et al. on Dec. 6, 1994, the complete disclosure of which is incorporated herein by reference, discloses a polymeric skin that can be molded by heating a mold surface to a temperature sufficient to melt a casting material and controllably projecting particles of the casting material toward the heated mold surface. Particles of the casting material that impinge on the mold surface melt and adhere to the mold surface. The mold surface is cooled to a temperature at which the casting material solidifies to form a skin. By varying the amount or type of material projected toward the heated mold surface, the method can make multilayer skins, skins from more than one material with a graded transition between materials, multicolor skins, and skim having a controlled, nonuniform thickness. In another example, U.S. Pat. No. 6,706,222 entitled "Molding Method For Making Plastic Foam-Backed Shells," issued to Gallagher, et al. on Mar. 16, 2004, the complete disclosure of which is incorporated herein by reference, discloses a method of molding a plastic shell having an outer pliable skin layer and a foam backing layer by casting a first skin layer portion from wear resistant material in a first casting sequence for those areas of the panel susceptible to high wear and in a second casting sequence casting self-skinning foamable material against the remaining portion of the mold surface and over the first-cast skin layer portion to develop, simultaneously, the remaining outer skin layer portion of the shell and a foam backing layer which extends across the entire skin layer. U.S. Pat. No. 4,174,823 entitled "Motor Vehicle Rear-View Mirrors," issued to Sutton, et al. on Nov. 20, 1979, the complete disclosure of which is incorporated herein by reference, discloses a rear view mirror for a motor vehicle of the kind having a stationary housing relative to which the reflective element is adjustable to give the required rear view has a housing which is molded in self-skinning foam plastics. The housing has resilient pillars which bear on the back of the reflective element near its periphery, with the pillars extending from the part of the housing behind the reflective element. In another example, U.S. Pat. No. 5,620,636 entitled "Process For Manufacturing Foam Molded Product," issued to Kawai, et al. on Apr. 15, 1997, the complete disclosure of which is incorporated herein by reference, discloses a foam molded product of a synthetic resin having a continuous hardened surface layer formed uniformly on a part or the whole of its surface during its foam-in-place molding and having a desired thickness. A mold and a process which can make such a product without bringing about any substantial change in an ordinary foam-molding operation are disclosed. Here, a part of foamable resin particles which are fed into the mold for making the product are caused to contact a mold surface heated to or above the melting point of the particles and melt to form a molten resin layer, and the molten resin layer is hardened to form the hardened surface layer. In another example, U.S. Pat. No. 5,238,622 entitled "Resinous Foam Formulation For Self-Skinning Cover Material," issued to Grimmer on Aug. 24, 1993, the complete disclosure of which is incorporated herein by reference, discloses a method of producing a molded foam article having an integral skin and a backing layer of foam comprising mixing particles of two polyvinyl compounds one of the compounds having a molecular weight less than that of the other compound and a higher solvating plasticizer than that of the other compound and casting the mixture against a heated mold surface and melting the one compound to flood the interstices of the particles of the other compound and float to the surface of the heated mold to form a skin and wherein the other compound includes foaming constituents to simultaneously form a layer of foam material behind the skin. In still another example, U.S. Pat. No. 4,291,851 entitled "Thermal Insulation For Aircraft Fuselage," issued to Johnson on Sep. 29, 1981, the complete disclosure of which is incorporated herein by reference, discloses a thermal insulating panel for an aircraft fuselage of the type utilizing a foam of the self-skinning type so as to resist penetration of moisture into the foam panel and help direct condensate away from the fuselage compartment.

Figure 10:
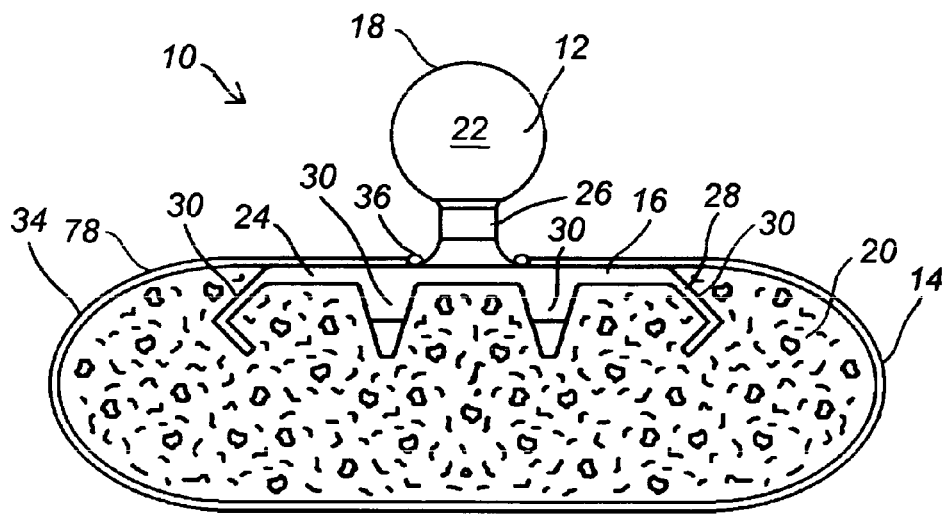

FIG. 10 illustrates the envelope 34 being formed over the shaped self-binding composition 20 of the malleable base structure 14 by coating with, by example and without limitation, a substantially oil-resistant layer 78. By example and without limitation, the substantially oil-resistant layer 78 is formed of conventional carboxylated nitrile rubbers obtained following a conventional dipping production process commonly used, for example, in manufacturing elastomeric gloves, such as medical and surgical gloves. The envelope layer 78 is optionally a natural rubber latex or polychloroprene latex. The envelope layer 78 is formed into the seal 36, for example, around the stem 26 of the presentation structure 18. Alternatively, by example and without limitation, the seal 36 is optionally formed around the periphery 64 of the frame's plate 24, as disclosed herein.

EP-B-0456333, November, 1991, discloses nitrile butadiene rubber for products manufactured using the conventional dipping production process. This nitrile butadiene rubber material is optionally used for forming the envelope layer 78 and results in a close snug fit. However, nitrile butadiene rubber material may incorporate stress relaxation properties that over time result in subsequently relaxation of the layer 78 from the continued application of pressure by the composition 20 in the envelope 34. Creep due to such stress relaxation can result in poor fitting of the envelope 34 to the composition 20 as the layer 78 gradually become loose with time.

EP 0559150A, September, 1993, discloses copolymer lattices containing carboxyl-modified nitrile rubber that can be used as the layer 78 to provide envelope 34 having high oil resistance and high mechanical strength.

Alternatively, the envelope layer 78 is an elastomeric carboxylated nitrile rubber as disclosed in U.S. Pat. No. 6,566,435, entitled "Elastomeric Gloves," issued to Teoh, et al. on May 20, 2003, the complete disclosure of which is incorporated herein by reference. For example, the layer 78 is made using prevulcanized carboxylated nitrile rubber latex with 2 to 6 percent by weight methacrylic acid equivalent. As disclosed by U.S. Pat. No. 6,566,435, conventional carboxylated nitrile rubbers result in a product that fits closely on the hand or other object.

Following the teachings of U.S. Pat. No. 6,566,435, the stress retention in the envelope 34 is controllably increased by using prevulcanized nitrite butadiene rubber latex, i.e., latex in which some vulcanization of the rubber by sulfur has been effected before the layer 78 is made. Prevulcanization (or maturation) of the rubber in this way then enables a desired stress retention of 50 to 70 percent to be obtained following a conventional dipping production process. Accordingly, the elastomeric layer 78 of the envelope 34 is optionally made of a carboxylated nitrite rubber having from 2 to 6 percent by weight methacrylic acid equivalent and which exhibits a stress retention of from 50 to 70 percent, this stress retention being the percentage retention of the initial stress after six minutes at 100 percent extension.

The elastomeric layer 78 of the envelope 34 is optionally non-chlorinated or chlorinated or polymer-coated, as desired. The carboxylated nitrite rubber latex used to make the layer 78 is optionally a copolymer of acrylonitrile, butadiene, and an unsaturated carboxylic acid. The unsaturated carboxylic acid is of acrylic acid type and may be, for example, acrylic acid, methacrylic acid, crotonic acid, itaconic acid, fumaric acid, or sorbic acid. The ratio of acrylonitrile to butadiene in the copolymer is selected as a function of the end use of the novel adaptive mounting device 10. For an industrial application requiring good resistance to organic solvents, the acrylonitrile content may be as high as 37 to 40 percent of the polymer. A copolymer of much lower acrylonitrile content is used, usually about 26 to 30 percent of the polymer can be used in applications where solvent resistance is less important than flexibility.

The nitrile rubber is cross-linked both by conventional vulcanization, i.e., by sulfur, vulcanization accelerators and zinc oxide, and by ionic crosslinking using polyvalent metal oxides, such as zinc oxide. The amount of polyvalent metal oxide used for the ionic cross-linking is optionally from about 0.1 to 0.5 phr (per hundred parts of nitrite rubber, dry basis), and may be controlled in the range from 0.2 to 0.4 phr. The polyvalent metal oxides effect crosslinking ionically between carboxylate groups in the polymer chain. The amount of sulfur used for crosslinking is from 1 to 3 phr. The crosslinking of the nitrite polymers achieved by sulfur crosslinks, both during the process and during prevulcanization, is the major effect and the ionic crosslinking via the polyvalent metal oxide and the carboxyl groups is the minor effect. The selection of a low level of carboxylation and of a low polyvalent metal oxide level keep the level of ionic crosslinks in the nitrite rubber relatively low. Ionic crosslinks exhibit higher stress relaxation characteristics than do sulfur crosslinks. The stress retention achieved can be controlled by varying the amounts of, and balance between, the two types of crosslink.

The carboxylated nitrite rubber latex is subjected to a prevulcanization (or maturation) step, which is optionally performed at least at 30 degrees C. for a minimum of 16 hours for fully compounded latex. However, different temperatures and times can be used to provide essentially the same effect and are also contemplated and are considered equivalent and are substituted therefore without departing from the scope and intent of the invention. In general, lower temperatures require longer times, and higher temperatures shorter times. The practical minima and maxima will be readily determinable by those skilled in the art with any particular latex formulation, bearing in mind the ultimate purpose of providing gloves with a stress retention of from 50 to 70 percent.

U.S. Pat. No. 6,067,731, entitled "Medical Shoe Cover And Method Of Forming Thereof," issued to Chen, et al. on May 30, 2000, the complete disclosure of which is incorporated herein by reference, discloses a method that may be useful for forming the elastomeric layer 78 as the tight fitting elastomeric cover envelope 34 in a dipping process. Accordingly, the method calls for dipping the formed self-binding composition 20 of the malleable base structure 14 into a solution of coagulant, drying the coagulant, dipping the form into a liquid elastomer preparation, and drying the elastomer.

The elastic material of the layer 78 is optionally a natural rubber latex. However, other elastomers such as nitrile and neoprene may also be employed. The material of the layer 78 is lightweight and optionally between 5 and 15 mils thick.

U.S. Pat. No. 5,776,520, entitled "Shell Molded Article Stripping Machine," issued to Howe, et al. on Jul. 7, 1998, the complete disclosure of which is incorporated herein by reference, discloses a method that may be useful for forming the elastomeric layer 78 as the tight fitting elastomeric cover envelope 34 using dipping molds in a shell molding process by which articles are molded upon a male form. Shell molding involves dipping the male form, here the shaped self-binding composition 20 of the malleable base structure 14, into a tank of liquid molding material such as one of the elastomeric materials discussed herein or another suitable elastomeric material. The elastomeric material adheres to the outer surface of the shaped self-binding composition 20, and upon curing or otherwise solidifying, produces the elastomeric layer 78 as the tight fitting elastomeric cover envelope 34 having a shape and size corresponding to the shaped self-binding composition 20.

Alternatively, U.S. Pat. No. 4,188,680, entitled "Method For Manufacturing Waterproof Boots," issued to Adams on Feb. 19, 1980, the complete disclosure of which is incorporated herein by reference, discloses a method that may be useful for forming the elastomeric layer 78 as the tight fitting elastomeric cover envelope 34 using a method for manufacturing boots of rubber or the like wherein the successive boot building operations are carried out on lasts carried by a movable conveyor indexed to and through stations spaced along a line. Here, an adhesive or a chemical reactant such as a coagulant solution is applied to the shaped self-binding composition 20 of the malleable base structure 14, latex dip coatings are applied using conventional dipping processes, and vulcanization and final lacquer spraying and trimming are performed at indexed stations.

Figure 11:
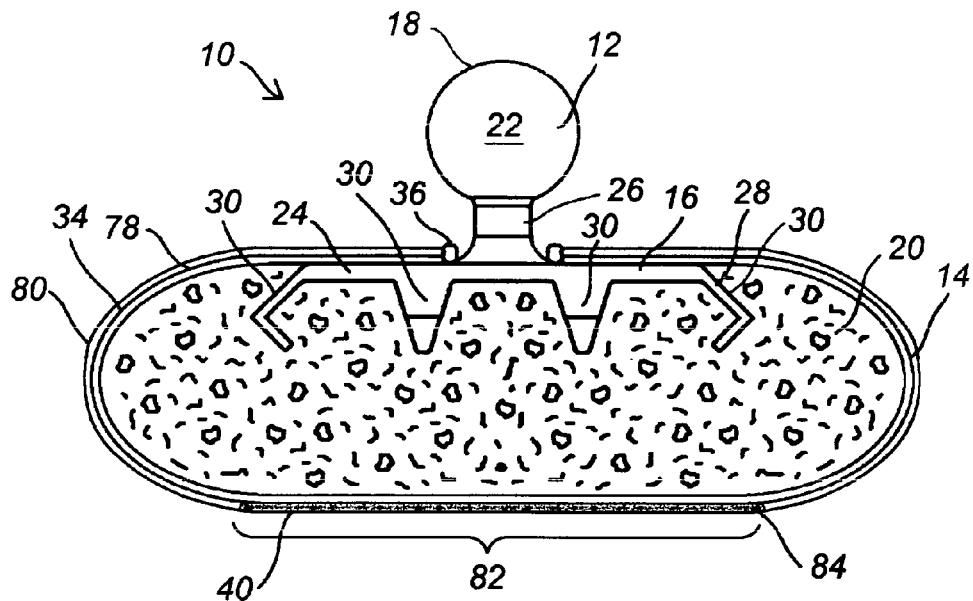

FIG. 11 illustrates an optional manufacturing operation for providing a second outer elastomeric layer 80 over the first elastomeric layer 78. The optional second outer layer 80 is added to provide useful properties that may not be present in the first inner layer 78. By example and without limitation, the first layer is a nitrite rubber or other material that more effectively bonds with the self-binding composition 20 of the malleable base structure-14, and the second layer 80 is a latex that is substantially water-resistant or water-proof As discussed in U.S. Pat. No. 6,566,435, which is incorporated herein by reference, for an industrial application requiring good resistance to organic solvents, the ratio of acrylonitrile to butadiene in the copolymer of the second outer layer 80 may be as high as 37 to 40 percent of the polymer. In applications where solvent resistance is less important than flexibility, the second outer layer 80 may be a copolymer of much lower acrylonitrile content is used, such as about 26 to 30 percent acrylonitrile. The first inner layer 78 is selected for adhesion to the self-binding composition 20, which may be for example an oil-based putty or silicone gel.

The seal 36 is extended to seal the second outer layer 80 as well as the first inner layer 78.

Optionally, at least the base portion 82 of the envelope 34 includes the traction enhancing mechanism 40 as friction enhancing agent 84 provided as a component of the envelope 34. The friction enhancing agent 84 improves traction to avoid slipping and sliding of the mating surface of the envelope 34 on the covering of the dashboard 1 or other surface. By example and without limitation, the friction enhancing agent 84 is amorphous fumed silica, dispersed in least the base portion 82 of the envelope 34. Such dispersion of a friction enhancing agent such as amorphous fumed silica is disclosed by U.S. Pat. No. 6,067,731, which is incorporated herein by reference.

Figure 12:
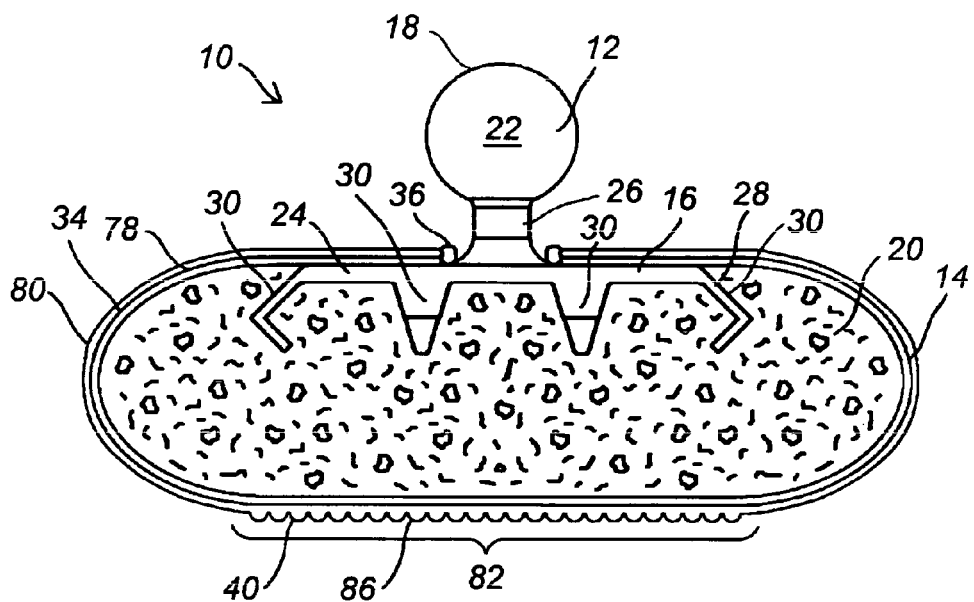

FIG. 12 illustrates the traction enhancing mechanism 40 being provided in another optional manufacturing operation as traction enhancing protrusions 86 formed on the base portion 82 of the envelope 34, which improves traction to avoid slipping and sliding of the mating surface of the envelope 34 on the covering of the dashboard 1 or other surface. By example and without limitation, the traction protrusions 86 are ridges, knobs, bumps, ribs, swirls, waffling or other protrusions or texturing or combination of texturing formed on the exterior of the envelope 34, i.e., on the exterior of the first inner layer 78, or the second outer layer 80 if present. U.S. Pat. No. 6,578,205, entitled "Disposable Glove," issued to King on Jun. 17, 2003, the complete disclosure of which is incorporated herein by reference, discloses a method that may be useful for forming the traction enhancing protrusions 86 formed on the base portion 82 of the envelope 34.

Figure 13:
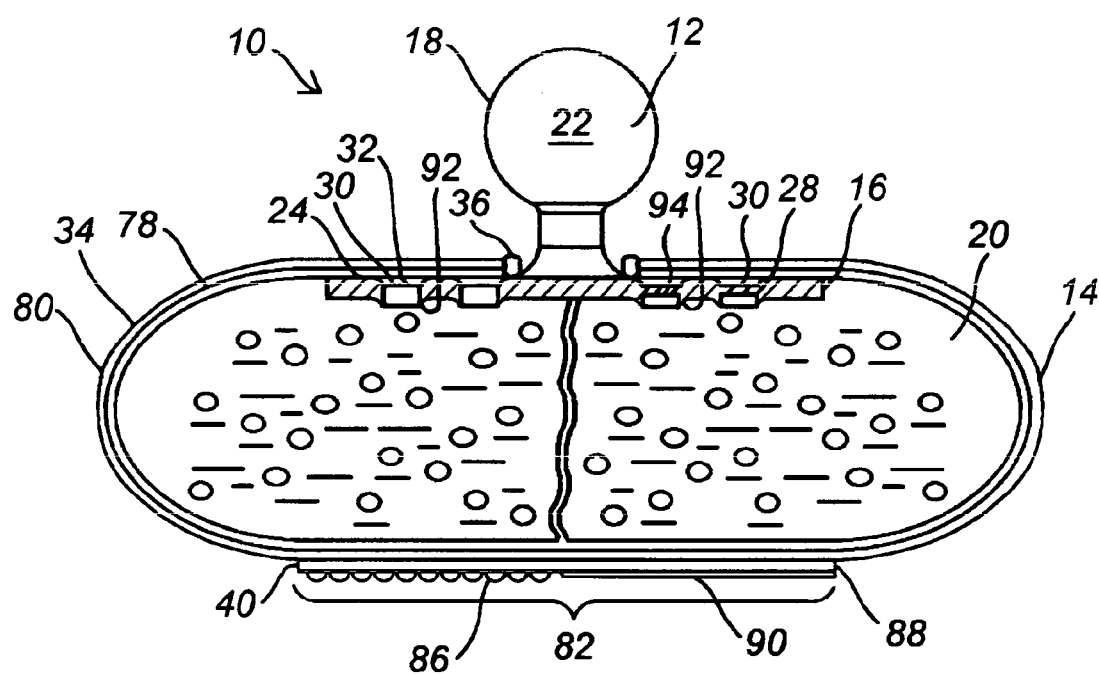

FIG. 13 illustrates the traction enhancing mechanism 40 provided in another optional manufacturing operation as the traction pad 88 on the base portion 82 of the envelope 34, which improves traction to avoid slipping and sliding of the mating surface of the envelope 34 on the covering of the dashboard 1 or other surface. By example and without limitation, the traction pad 88 is formed of a high surface friction material, such as a Vinyl or a low durometer polyvinylchloride (PVC) material or another suitable plastic material. The traction pad 88 is optionally formed with the traction enhancing protrusions 86 as any of the ridges, knobs, bumps, ribs, swirls, waffling or other protrusions or texturing formed on the exterior of the envelope 34, i.e., on the exterior of the first inner layer 78, or the second outer layer 80 if present. The traction pad 88 is adhered to the base portion 82 of the envelope 34, either chemically during cure of the first inner layer 78, or the second outer layer 80 if present, or using a direct-molding or sole-casting method, or adhesively using an appropriate adhesive. U.S. Pat. No. 3,858,263, entitled "Semiautomatic Footwear Production Line," issued to Smirnov, et al. on Jan. 7, 1975, the complete disclosure of which is incorporated herein by reference, discloses a method that may be useful for adhering the traction pad 88. By example and without limitation, U.S. Pat. No. 3,858,263 discloses a semiautomatic line for producing footwear with the bottom attached by the cementing, vulcanizing or direct-molding or sole-casting method, incorporates a number of separate sections each of which is one machine that makes part of the line, and a device to control the operation of the machine.

Alternatively, the traction pad 88 is double-backed adhesive tape or a resilient adhesive pad of a type commonly known as a Pressure Sensitive Adhesive (PSA) applied to the base portion 82 of the envelope 34; Alternatively, the traction pad 88 is another well-known bi-adhesive tape as taught by both Tarulli in U.S. Pat. No. 5,992,807 and Won in U.S. Pat. No. 6,149,116, the complete disclosures of which are incorporated herein by reference. Such adhesive tapes and pads are optionally protected with a protective wax paper shield 90 that protects them from dirt and oil during shipment and initial conforming of the base portion 82 of the envelope 34 to the target mounting surface, i.e., the dashboard 1 or other surface. After the envelope 34 is conformed to the target surface, the shield 90 is removed from the adhesive traction pad 88, and the malleable base structure 14 is emplaced in the desired position. Thereafter, the adaptive mounting device 10 is movable only by separating the adhesive traction pad 88 from the mounting surface. However, after separation, the adaptive mounting device 10 is reusable by substituting a replacement adhesive traction pad 88, either in place of the original pad 88, or over its remains.

Here, equivalent of the connector structure 28 is illustrated by example and without limitation for fixedly coupling with the plastically formable composition 20 and becoming embedded therein. The plurality of grippers 30 of the connector structure 28 is illustrated here (left side) by example and without limitation as a plurality of passages or holes 32 through the rigid plate 24 of the frame 16 and within the envelope 34. Accordingly, when the moldable composition 20 is of a sufficiently low viscosity, such as a liquid resin 46, it runs or seeps into the passages or holes 32 which provides anchorage for the moldable composition 20. Optionally, the rigid plate 24 of the frame 16 is formed with dimples or other upset 92 of the material around the passages or holes 32 which enhances anchorage for the moldable composition 20.

Alternatively, the connector structure 28 is illustrated here (right side) by example and without limitation as a plurality of recesses 94 indented into the rigid plate 24 of the frame 16 and within the envelope 34. The recesses 95 also provide anchorage for the moldable composition 20. Optionally, the rigid plate 24 of the frame 16 is formed with the dimples or other upset 92 of the material around the recesses 95 which enhances anchorage for the moldable composition 20.

Figure 14:
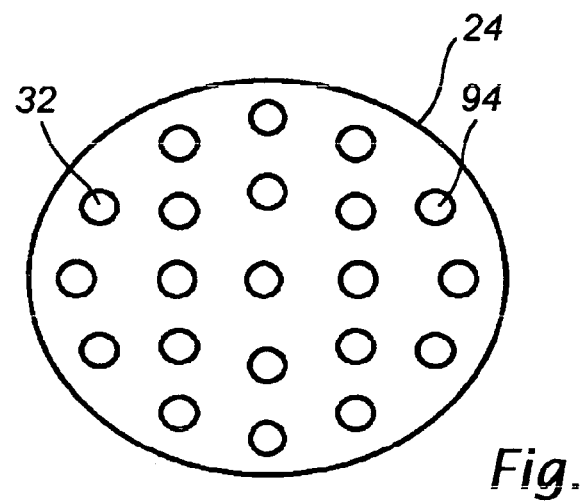

FIG. 14 illustrates the rigid plate 24 of the frame 16 being formed by example and without limitation having a substantially circular shape. Other shapes, including squares, rectangles, ellipses, trapezoids, triangles, and other shapes are also are also contemplated and are considered equivalent structures and are substituted therefore without departing from the scope and intent of the invention.

While the preferred embodiment of the invention has been illustrated and described, it will be appreciated that various changes can be made therein without departing from the spirit and scope of the invention.

What is claimed is:

1. An adaptive mounting device, comprising:
    a substantially plastically formable composition;
    a substantially flexible container substantially completely enclosing the substantially plastically formable composition therein;
    a support structure at least partially embedded in the plastically formable composition; and
    a presentation structure substantially supported on the support structure in a position substantially external of the container.

2. The device of claim 1 wherein the container further comprises a traction mechanism positioned substantially opposite from the support structure.

3. The device of claim 1 wherein the plastically formable composition further comprises a cohesively strong but pliable and ductile compound.

4. The device of claim 3 wherein the compound further comprises a putty.

5. The device of claim 4 wherein the plastically formable composition further comprises a hardening agent.

6. The device of claim 1, further comprising a container seal between the support structure and the presentation structure, the container seal substantially sealing the composition within the container.

7. The device of claim 6 wherein the container further comprises a first layer of a first substantially flexible material, and a second layer of a second substantially flexible material.

8. An adaptive mounting device, comprising:
- a substantially malleable base structure comprising a substantially flexible envelope at least partially filled with a substantially plastically formable composition, the envelope substantially completely surrounding the composition and substantially sealing the composition therein; and
- a mounting structure comprising a frame at least partially embedded in the plastically formable composition and supporting a presentation structure positioned at least partially external of the envelope.

9. The device of claim 8 wherein the plastically formable composition further comprises a cohesively strong, pliable and ductile putty compound.

10. The device of claim 8 wherein the plastically formable composition further comprises a hardenable component.

11. The device of claim 10 wherein the envelope further comprises a sealable portal thereinto.

12. The device of claim 10 wherein the envelope further comprises first and second chambers separated by a breakable membrane.

13. The device of claim 12 wherein the first chamber is at least partially filled with the hardenable component, and the second chamber is at least partially filled with a hardening agent.

14. The device of claim 8 wherein the envelope further comprises a first layer of a first substantially flexible material, and a second layer of a second substantially flexible material.

15. The device of claim 8 wherein the envelope further comprises a traction mechanism positioned substantially opposite of the mounting structure.

16. The device of claim 8 wherein the envelope further comprises a seal formed between the frame and presentation structure of the mounting structure.

17. An adaptive mounting device, comprising:
- a substantially malleable base structure having a plastically formable composition substantially sealed within an envelope formed of a substantially flexible material;
- a mounting structure, comprising: a substantially rigid frame having a connector structure within the envelope and at least partially embedded in the plastically formable composition, and a presentation structure extended from the frame at least partially external of the envelope; and
- a seal formed between the envelope and the mounting structure.

18. The device of claim 17 wherein the connector structure further comprises a plurality of grippers projected from the frame opposite from the presentation structure.

19. The device of claim 17 wherein the connector structure further comprises a plurality of plurality of holes formed in a substantially rigid plate portion of the frame.

20. The device of claim 17 wherein the envelope further comprises a first layer of a first substantially flexible oil-resistant material, and a second layer of a second substantially flexible water-resistant material.

21. The device of claim 20 wherein the plastically formable composition further comprises a cohesively strong, pliable and ductile putty compound formed of linseed oil and ground chalk.

22. The device of claim 17 wherein the plastically formable composition further comprises a hardenable resin; and
further comprising a means for introducing a hardening agent into the hardenable resin.

23. A method for manufacturing an adaptive mounting device, the method comprising:
- providing a substantially plastically formable composition substantially completely within a substantially flexible container;
- at least partially embedding a portion of a support structure in the plastically formable composition; and
- substantially supporting a presentation structure on the support structure external of the composition and the container.

24. The method of claim 23, further comprising substantially sealing the composition in the container.

25. The method of claim 23 wherein forming the container further comprises forming a layer of elastomeric material over the composition.

26. The method of claim 25 wherein forming the container further comprises forming a second layer of elastomeric material over a first layer of elastomeric material.

27. The method of claim 23 wherein providing a substantially plastically formable composition further comprises providing a putty compound formed of oil and ground chalk.

28. The method of claim 23, further comprising providing means for introducing a hardening agent to the composition.

* * * * *